US012737256B2

(12) United States Patent
Cheng

(10) Patent No.: US 12,737,256 B2
(45) Date of Patent: Sep. 15, 2026

(54) METHOD OF OPERATING MEMORY CONTROLLER, MEMORY SYSTEM, AND RELATED DEVICES

(71) Applicant: YANGTZE MEMORY TECHNOLOGIES CO., LTD., Wuhan (CN)

(72) Inventor: Mo Cheng, Wuhan (CN)

(73) Assignee: Yangtze Memory Technologies Co., Ltd., Wuhan (CN)

(*) Notice: Subject to any disclaimer, the term of this patent is extended or adjusted under 35 U.S.C. 154(b) by 0 days.

(21) Appl. No.: 18/910,926

(22) Filed: Oct. 9, 2024

(65) Prior Publication Data

US 2025/0335292 A1 Oct. 30, 2025

(30) Foreign Application Priority Data

Apr. 30, 2024 (CN) ......................... 202410545084.0

(51) Int. Cl.
*G06F 11/10* (2006.01)
*G06F 11/30* (2006.01)

(52) U.S. Cl.
CPC ...... *G06F 11/1016* (2013.01); *G06F 11/3058* (2013.01)

(58) Field of Classification Search
CPC ............. G06F 11/1016; G06F 11/3058; G06F 11/3037
See application file for complete search history.

(56) References Cited

U.S. PATENT DOCUMENTS

| | | | | |
|---|---|---|---|---|
| 10,685,711 | B1 | 6/2020 | Lin et al. | |
| 2019/0267054 | A1 | 8/2019 | Thalaimalaivanaraj et al. | |
| 2020/0142799 | A1* | 5/2020 | Hiruta | G06F 11/3037 |
| 2020/0319826 | A1* | 10/2020 | Shin | G06F 3/0604 |

FOREIGN PATENT DOCUMENTS

CN 114067892 A 2/2022

OTHER PUBLICATIONS

Yangtze Memory Technologies Co., Ltd., "First Review Comments," dated Jun. 26, 2026, CN Patent App. No. 202410545084.0, 9 p. (plus 9 p. translation).

* cited by examiner

*Primary Examiner* — Thien Nguyen
(74) *Attorney, Agent, or Firm* — Conley Rose, P.C.

(57) ABSTRACT

In an example, a method of operating the memory controller comprises: recording a memory space and a write temperature corresponding to writing data to a memory device in response to a temperature of the memory device meeting a second temperature condition; acquiring a memory space and a write temperature corresponding to to-be-rewritten data in the memory device in response to the temperature of the memory device meeting a first temperature condition; and performing a rewrite operation on the to-be-rewritten data according to the memory space and the write temperature corresponding to the to-be-rewritten data.

18 Claims, 14 Drawing Sheets

| LOW TEMPERATURE LIST | VB1 | VB2 | VB3 | VB4 | ... |
|---|---|---|---|---|---|
| | -40°C | -20°C | -20°C | -10°C | ... |

| HIGH TEMPERATURE LIST | VB100 | VB101 | VB102 | VB103 | ... |
|---|---|---|---|---|---|
| | 35°C | 30°C | 30°C | 25°C | ... |

METHOD OF OPERATING MEMORY CONTROLLER, MEMORY SYSTEM, AND RELATED DEVICES

CROSS-REFERENCE TO RELATED APPLICATIONS

The present application claims priority to Chinese Patent Application No. 2024105450840, which was filed Apr. 30, 2024, is titled "METHOD OF OPERATING STORAGE CONTROLLER, STORAGE SYSTEM AND RELATED EQUIPMENT," and is hereby incorporated herein by reference in its entirety.

TECHNICAL FIELD

The present disclosure relates to the technical field of semiconductor memory, and in particular to a method of operating a memory controller, a memory system, an electronic device, a solid state drive, a memory controller, a host device, a computer-readable memory medium, and a computer program product.

BACKGROUND

A semiconductor memory device (for example, a Not AND (NAND) memory device) is a memory storing data using a semiconductor memory technology, of which the data read-write performance and the data retention capability are affected by a temperature.

For a semiconductor memory device, when data written at a temperature is read at another temperature, the data may fail to be read or the data may be read incorrectly.

SUMMARY

The present disclosure provides a method of operating a memory controller, a memory system, an electronic device, a solid state drive, a memory controller, a host device, a computer-readable memory medium, and a computer program product.

Other features of the present disclosure will become apparent through the following detailed description, or will be learned in part through the practice of the present disclosure.

According to an aspect of the present disclosure, a method of operating a memory controller is provided. The method comprises: acquiring a memory space and a write temperature corresponding to to-be-rewritten data in a memory device in response to a temperature of the memory device meeting a first temperature condition; and performing a rewrite operation on the to-be-rewritten data according to the memory space and the write temperature corresponding to the to-be-rewritten data.

In some examples, the first temperature condition is that a temperature difference between the temperature of the memory device and the write temperature exceeds a first temperature difference threshold.

In some examples, the first temperature condition is that the temperature difference between the temperature of the memory device and the write temperature is less than a second temperature difference threshold.

In some examples, the first temperature condition is that the temperature of the memory device is between a first threshold and a second threshold, wherein the second threshold is greater than the first threshold.

In some examples, the method further comprises: monitoring the temperature of the memory device.

In some examples, the to-be-rewritten data is data that has been written when the temperature of the memory device meets a second temperature condition; and the method further comprises: recording a memory space and a write temperature corresponding to writing of the data to the memory device in response to the temperature of the memory device meeting the second temperature condition.

In some examples, the second temperature condition is that the temperature of the memory device is less than a third threshold or greater than a fourth threshold, wherein the fourth threshold is greater than the third threshold.

In some examples, recording the memory space and the write temperature corresponding to the to-be-rewritten data in response to the temperature of the memory device meeting the second temperature condition comprises: recording the memory space and the write temperature corresponding to writing of the data to the memory device in a first list in response to the temperature of the memory device being less than the third threshold; and recording the memory space and the write temperature corresponding to writing of the data to the memory device in a second list in response to the temperature of the memory device being greater than the fourth threshold.

In some examples, performing the rewrite operation on the to-be-rewritten data according to the memory space and the write temperature corresponding to the to-be-rewritten data comprises: reading the memory space and the write temperature corresponding to the to-be-rewritten data from at least one of the first list or the second list, and performing the rewrite operation on the to-be-rewritten data.

In some examples, reading the memory space and the write temperature corresponding to the to-be-rewritten data from at least one of the first list or the second list, and performing the rewrite operation on the to-be-rewritten data comprises at least one of the following: sorting memory spaces recorded in the first list in ascending order of write temperature, sequentially reading data of the corresponding memory spaces according to a sorting result, and performing the rewrite operation; and sorting memory spaces recorded in the second list in descending order of write temperature, sequentially reading data of the corresponding memory spaces according to a sorting result, and performing the rewrite operation.

In some examples, the memory space and the write temperature corresponding to the to-be-rewritten data is recorded in units of virtual blocks in the first list and the second list.

In some examples, the method further comprises: receiving a data rewrite command, wherein the data rewrite command is used for the memory controller to perform the rewrite operation on the to-be-rewritten data when the temperature of the memory device meets the first temperature condition.

In some examples, the memory space and the write temperature corresponding to the to-be-rewritten data are stored in a host memory of a host or a controller memory of the memory controller.

In some examples, the memory device is a NAND memory device.

According to another aspect of the present disclosure, a memory system is further provided. The memory system comprises: a host, a memory controller, and a memory device, wherein the memory controller is coupled with the memory device; the host is configured to send a data rewrite command to the memory controller; and the memory controller is configured to: after receiving the data rewrite command from the host, acquire a memory space and a write temperature corresponding to to-be-rewritten data in the memory device in response to a temperature of the memory device meeting a first temperature condition, and perform a rewrite operation on the to-be-rewritten data according to the memory space and the write temperature corresponding to the to-be-rewritten data.

According to another aspect of the present disclosure, a memory system is further provided. The system comprises: a memory device; and a memory controller coupled to the memory device, wherein the memory controller is configured to: acquire a memory space and a write temperature corresponding to to-be-rewritten data in response to a temperature of the memory device meeting a first temperature condition; and perform a rewrite operation on the to-be-rewritten data according to the memory space and the write temperature corresponding to the to-be-rewritten data.

In some examples, the system further comprises: a temperature sensor, connected with the memory controller, and configured to monitor the temperature of the memory device.

In some examples, the memory controller is further configured to record the memory space and the write temperature corresponding to the to-be-rewritten data in response to the temperature of the memory device meeting a second temperature condition.

In some examples, the memory controller comprises: a controller memory, wherein the controller memory is configured to store the memory space and the write temperature corresponding to the to-be-rewritten data that are recorded.

In some examples, the system further comprises: a host, connected with the memory controller, and configured to send a data rewrite command to the memory controller, to enable the memory controller to perform the rewrite operation on the to-be-rewritten data in the memory device when the temperature of the memory device meets the first temperature condition.

In some examples, the host comprises: a host memory, wherein the host memory is configured to store the memory space and the write temperature corresponding to the to-be-rewritten data that are recorded.

According to another aspect of the present disclosure, an electronic device is further provided. The electronic device comprises any above memory system.

According to another aspect of the present disclosure, a solid state drive is further provided. The solid state drive comprises: a flash memory; and a flash memory controller connected with the flash memory, wherein the flash memory controller is configured to: acquire a memory space and a write temperature corresponding to to-be-rewritten data in response to a temperature of the flash memory meeting a first temperature condition; and perform a rewrite operation on the to-be-rewritten data according to the memory space and the write temperature corresponding to the to-be-rewritten data.

According to another aspect of the present disclosure, a memory controller is further provided. The memory controller comprises: a memory device interface, configured to connect a memory device; and a controller processor, connected with the memory device interface, and configured to: acquire a memory space and a write temperature corresponding to to-be-rewritten data in the memory device in response to a temperature of the memory device meeting a first temperature condition; and perform a rewrite operation on the to-be-rewritten data according to the memory space and the write temperature corresponding to the to-be-rewritten data.

In some examples, the memory controller further comprises: a controller memory, connected with the controller processor, and configured to store the memory space and the write temperature corresponding to the to-be-rewritten data that are recorded.

According to another aspect of the present disclosure, a host device is further provided, comprising: a command sending module, configured to send a data rewrite command to a memory controller, to enable the memory controller to acquire a memory space and a write temperature corresponding to to-be-rewritten data in a memory device in response to a temperature of the memory device meeting a first temperature condition, and perform a rewrite operation on the to-be-rewritten data according to the memory space and the write temperature corresponding to the to-be-rewritten data.

According to another aspect of the present disclosure, a computer-readable memory medium is provided, storing a computer program thereon, wherein the computer program, when being executed by a processor, implements any above method of operating the memory controller.

According to another aspect of the present disclosure, a computer program product is provided, comprising: a computer program or instructions, wherein the computer program or instructions, when being executed by a processor, implement any above method of operating the memory controller.

The above general description and the following detailed description are merely exemplary and explanatory, and does not limit the present disclosure.

BRIEF DESCRIPTION OF THE DRAWINGS

The accompanying drawings are incorporated in the specification and constitute a part of the specification, show examples conforming to the present disclosure, and are used together with the specification to explain the principle of the present disclosure. Apparently, the drawings described below are only some examples of the present disclosure simply. A person of ordinary skill in the art may obtain other drawings according to such drawings without creative work.

DETAILED DESCRIPTION

Figure 1:
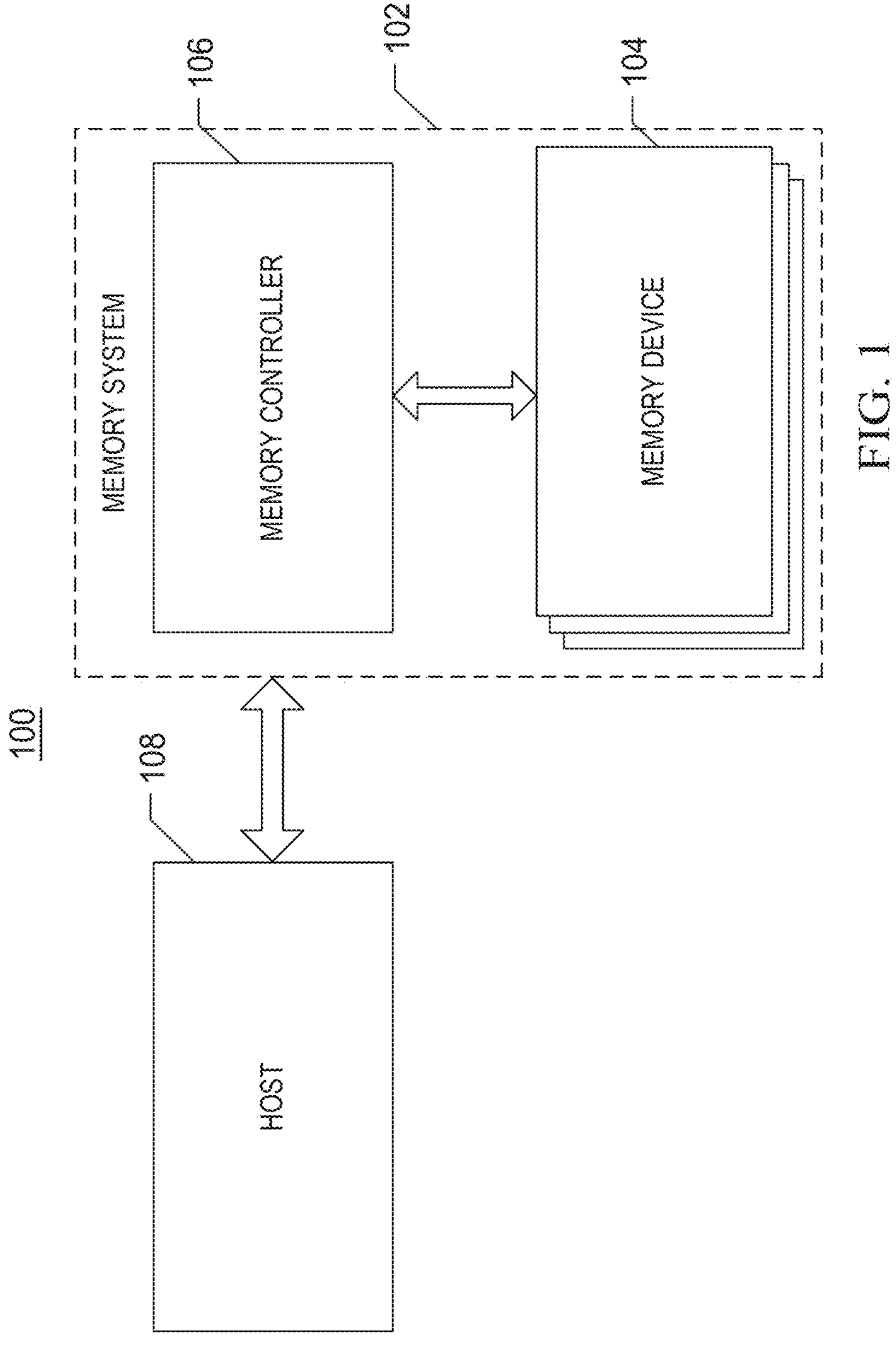
FIG. 1 is a schematic diagram illustrating an example system comprising a memory system in an example of the present disclosure.

Example implementations are described more comprehensively with reference to the drawings. However, example implementations can be implemented in various forms and should not be construed as limited to the examples set forth herein. On the contrary, these implementations are provided for more thorough and complete understanding of the present disclosure, and to fully convey the concept of the example implementations to a person skilled in the art. The described features, structures or characteristics may be combined in one or more implementations in any proper manner.

In addition, the drawings are merely schematic illustrations of the present disclosure and are not necessarily drawn to scale. The same reference signs in the drawings denote same or similar parts, and thus detailed descriptions will be omitted. Some of the block diagrams shown in the drawings are functional entities and do not necessarily have to correspond to physically or logically separate entities. These functional entities may be implemented in a software form, or in one or more hardware modules or integrated circuits, or in different networks and/or processor apparatuses and/or microcontroller apparatuses.

For ease of understanding, before the examples of the present disclosure are introduced, some terms or nouns involved in the examples of the present disclosure are first explained as follows:

A Cross-Temperature (x-temp) read-write temperature difference is a temperature difference value between two temperatures, wherein data is written to a memory device at one of the temperatures, and the data is read at the other one of the temperatures.

A Virtual Block (VB) is a logical memory space, and corresponds to one or more physical blocks or memory blocks on the memory device. A logical address of the virtual block may be mapped to a physical address of the one or more physical blocks (or memory blocks) on the memory device.

For a data rewrite command, a host sends a front-end command to a memory controller, and after receiving the front-end command, the memory controller may control the memory device to perform a rewrite operation of data, for example, read out data that has been written to the memory device and rewrite the data.

Implementations of examples of the present disclosure are illustrated below in detail in conjunction with the drawings.

FIG. 1 is a schematic diagram illustrating an example system comprising a memory system in an example of the present disclosure. The system 100 may be a mobile phone, a desktop computer, a laptop computer, a tablet computer, a vehicle computer, a gaming console, a printer, a positioning device, a wearable electronic device, a smart sensor, a Virtual Reality (VR) device, an Augmented Reality (AR) device, or any other suitable electronic device having a memory device therein. As shown in FIG. 1, the system 100 may comprise a host 108 and a memory system 102, and the memory system 102 may comprise a memory controller 106 and one or more memory devices 104.

In some examples, the host 108 may be a processor, e.g., a Central Processing Unit (CPU), etc. of any electronic device. In some other examples, the host 108 may be a System on Chip (SoC), e.g., an Application Processor (AP), etc. The host 108 may be coupled to the memory controller 106, and is configured to transmit or receive data to or from the memory device 104 through the memory controller 106. For example, the host 108 may transmit program data in a program operation or receive read data in a read operation. The host 108 may be configured to receive an instruction or a command from the memory controller 106 of the memory system 102 and send an instruction or a command to the memory controller 106 of the memory system 102, and perform or implement a plurality of functions and operations provided in examples of the present disclosure.

In some examples, the memory device 104 may comprise a memory array and a peripheral circuit. The memory array may be formed by any type of memory cells (for example, non-volatile memory cells, volatile memory cells or any combination thereof). The memory device 104 may be configured to receive a command and an address from the memory controller 106, and access a region selected by the address in a memory cell array. For example, the memory device 104 performs internal operations, e.g., a program (write) operation, a read operation, and an erase operation, corresponding to the command on the region selected by the address. During the program operation, the memory device 104 may program data into the region selected by the address. During the read operation, the memory device 104 may read the data from the region selected by the address. During the erase operation, the memory device 104 may erase the data stored in the region selected by the address. In some examples, the memory device 104 may perform the program operation or the read operation in pages, and may perform the erase operation in memory blocks.

In some examples, the memory controller 106 is coupled to the memory device 104, communicates with the host 108, and may be configured to control operations, e.g., a program (write) operation, a read operation, and an erase operation, of the memory device 104. In some other examples, the memory controller 106 may further be configured to manage various functions with respect to data stored or to be stored in the memory device 104, comprising, but not limited to, bad-block management, Garbage Collection (GC), logical-to-physical address conversion, wear leveling, etc. In some other examples, the memory controller 106 may be further configured to process Error Correction Codes (ECC) with respect to the data read from or written to the memory device 104. In a practical application, the memory controller 106 may further execute any other suitable functions, for example, format the memory device 104, etc.

The memory controller 106 may be implemented through any of the following: a microprocessor, a microcontroller (also referred to as a Microcontroller Unit (MCU)), a Digital Signal Processor (DSP), an Application Specific Integrated Circuit (ASIC), a Field-Programmable Gate Array (FPGA), a Programmable Logic Device (PLD), a state machine, a gating logic, a discrete hardware circuit, and other suitable hardware, firmware, and/or software configured to perform various functions described below in detail.

The memory controller 106 may communicate with an external device (e.g., the host 108) according to a particular communication protocol. For example, the memory controller 106 may communicate with the external device through any of various interface protocols. The interface protocols here may comprise, but not limited to, one or more of the following: a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, a Firewire protocol, etc.

In some implementations, the memory controller 106 may be designed for operating in a low duty-cycle environment such as Secure Digital (SD) cards, Compact Flash (CF) cards, USB flash drives, or other media for use in electronic devices, such as personal computers, digital cameras, mobile phones, etc. In some implementations, the memory controller 106 may be designed for operating in a high duty-cycle environment, such as a Solid-State Disk (SSD) or an Embedded MultiMedia Card (eMMC), which is widely used in mobile devices such as a smartphone, a tablet computer, a laptop computer, etc. and an enterprise memory system.

In some examples, the memory controller 106 and the one or more memory devices 104 may be integrated into various types of memory devices, for example, be comprised in the same package (e.g., a Universal Flash Memory (UFS) package or an eMMC package). For example, the memory system 102 may be implemented and packaged into different types of end electronic products.

In some examples, when the memory device 104 of the memory system 102 is a semiconductor memory device (e.g., a NAND memory device), the data read-write performance and the data retention capability of the memory device 104 are affected by a temperature.

For example, a maximum cross-temperature read-write temperature difference currently supported by a NAND memory device is 120° C. However, for a system product comprising the NAND memory device, a range of an operating temperature that the system product can support is −40° C.–105° C., and a temperature difference (e.g., data is written at −40° C., the data is read at 90° C., and the cross-temperature read-write temperature difference is ΔT=130° C.) between data write and read may exceed the cross-temperature read-write temperature difference (120° C.) supported by the memory device. As a result, the memory device encounters a problem that the data may fail to be read or may be read incorrectly. How to improve a cross-temperature read-write temperature difference capability supported by the memory device to enable the memory device to adapt to an operating temperature range of a system or product of the memory device is an urgent technical problem to be solved at present.

In the method of operating the memory controller provided in examples of the present disclosure, a temperature of the memory device 104 is monitored, and the memory controller 106 controls the memory device to rewrite, at a suitable temperature (a first temperature condition), data that has been written at a low temperature or a high temperature (a second temperature condition), such that data written at a low temperature on the memory device 104 can be correctly read at a high temperature, and data written at a high temperature can be correctly read at a low temperature, thereby improving a cross-temperature read-write capability of the memory device 104.

In implementations of examples of the present disclosure, the temperature of the memory device 104 may be measured by a temperature sensor. The temperature sensor configured to measure the temperature of the memory device here may be a temperature sensor on the host 108 or may be a temperature sensor directly connected with the memory controller in the memory system 102. The position of the temperature sensor is not limited in the present disclosure, as long as the temperature sensor can be configured to measure the temperature of the memory device 104.

Figure 2:
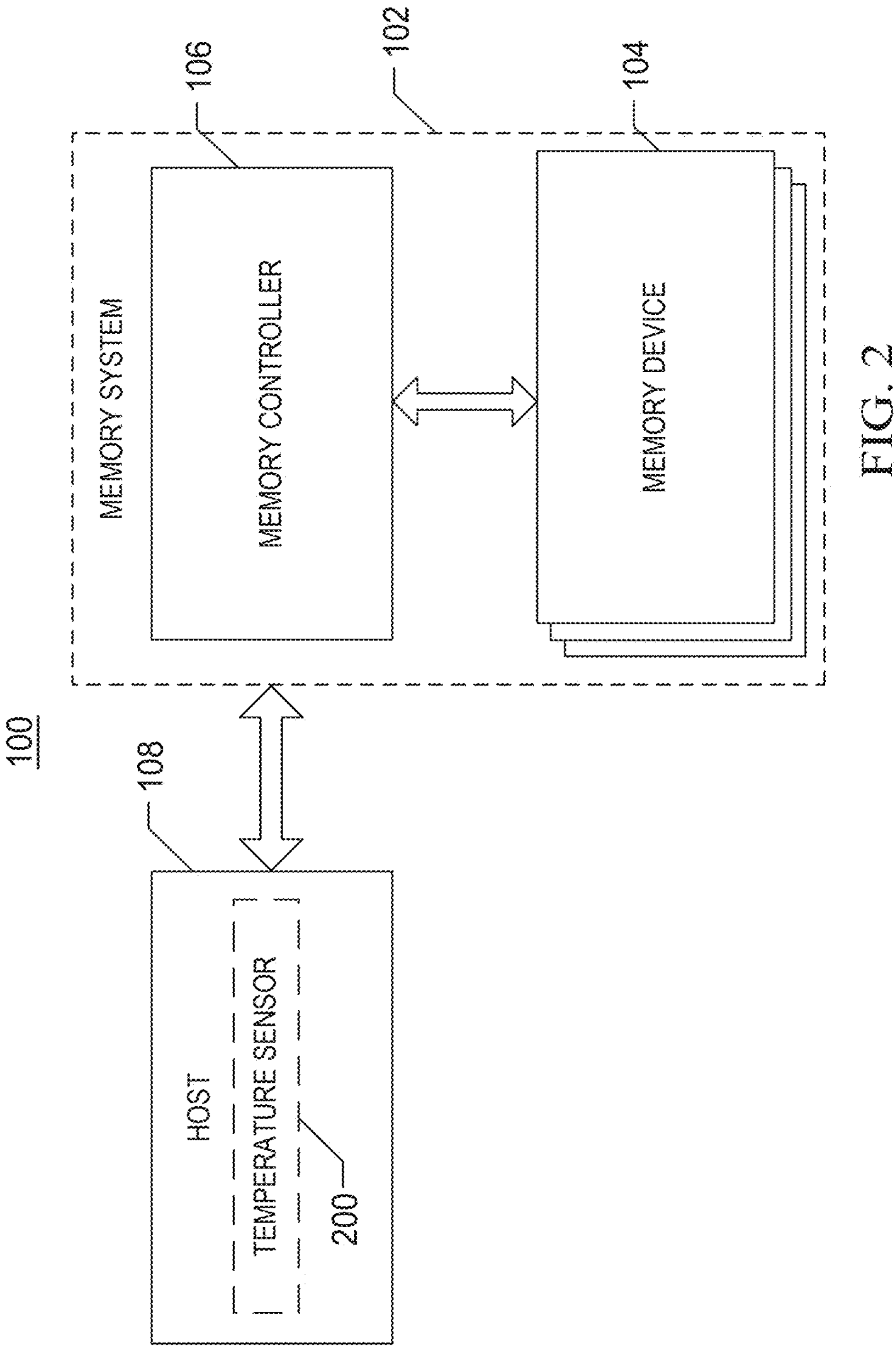
FIG. 2 is a schematic diagram illustrating a system comprising a temperature sensor and a memory system in an example of the present disclosure.

FIG. 2 is a schematic diagram illustrating a system comprising a temperature sensor and a memory system in an example of the present disclosure. As shown in FIG. 2, in a system 100 comprising a memory system 102 and a host 108, a temperature sensor 200 on the host 108 may measure a temperature of a memory device 104. When the temperature of the memory device 104 meets a first temperature condition (a suitable temperature), a memory space and a write temperature corresponding to to-be-rewritten data in the memory device 104 are acquired, and a rewrite operation is performed on the to-be-rewritten data according to the memory space and the write temperature corresponding to the to-be-rewritten data.

In some examples, the to-be-rewritten data is data written to the memory device 104 when a second temperature condition (a low temperature or a high temperature) is met. When data is written to the memory device in the case that the second temperature condition (a low temperature or a high temperature) is met, a memory space and a write temperature corresponding to writing of the data to the memory device 104 are recorded, such that when the temperature of the memory device 104 meets the first temperature condition (a suitable temperature), a rewrite operation is performed according to the memory space and the write temperature corresponding to the to-be-rewritten data that are recorded.

In some examples, the host 108 may send a data rewrite command to a memory controller 106, to enable the memory controller 106 to perform a rewrite operation on the to-be-rewritten data in response to the temperature of the memory device 104 meeting the first temperature condition (a suitable temperature).

In some examples, the first temperature condition may be that the temperature of the memory device 104 is between a first threshold and a second threshold, wherein the second threshold is greater than the first threshold. The second temperature condition may be that the temperature of the memory device 104 is less than a third threshold or greater than a fourth threshold, wherein the fourth threshold is greater than the third threshold, the third threshold may be less than or equal to the first threshold, and the fourth threshold may be greater than or equal to the second threshold.

In some other examples, the first temperature condition may be that a temperature difference between the temperature of the memory device 104 and the write temperature exceeds a first temperature difference threshold. For example, a data rewrite operation may be performed as long as it is detected that a temperature difference value between the temperature of the memory device 104 and a data write temperature exceeds a particular threshold. It is to be noted that, in this example, the temperature difference value between the temperature of the memory device 104 and the data write temperature cannot exceed a cross-temperature (for example, a temperature difference supported by cross-temperature write-read, e.g., 120 degrees) supported by the memory device 104. Therefore, in some examples, the first temperature condition is that the temperature difference between the temperature of the memory device and the write temperature exceeds the first temperature difference threshold and is less than a second temperature difference threshold, wherein the second temperature difference threshold is less than or equal to a cross-temperature supported by the memory device 104.

In an implementation, the first threshold, the second threshold, the third threshold, the fourth threshold, the first temperature difference threshold, and the second temperature difference threshold in the examples of the present disclosure may be configured according to actual situations, and are not limited in the present disclosure.

However, in some memory system scenarios without the host 108, the temperature sensor 200 needs to be disposed in the memory system 102 to monitor the temperature of the memory device 104.

Figure 3:
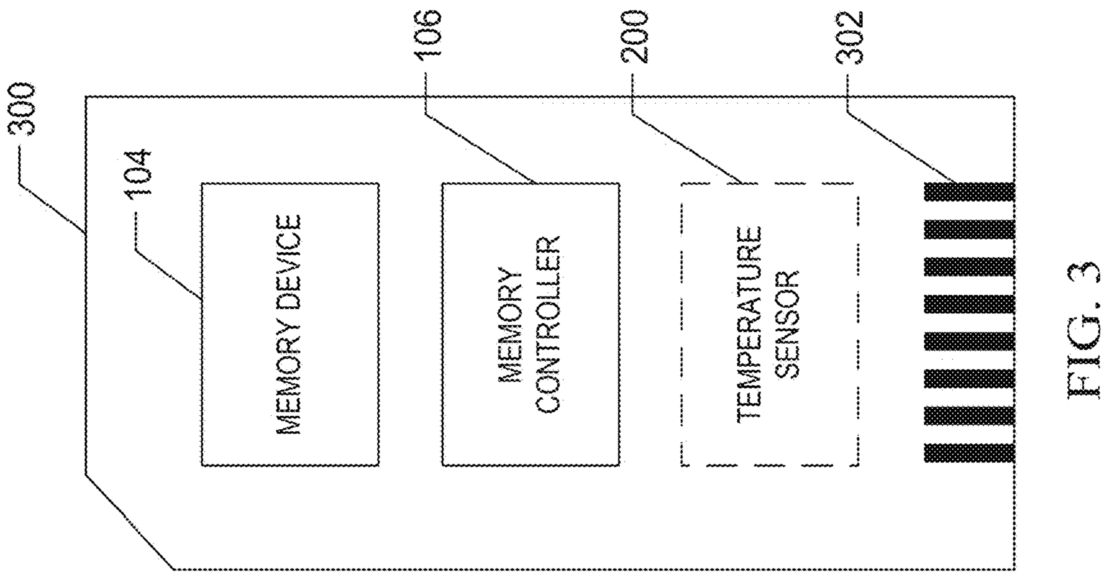
FIG. 3 is a schematic diagram illustrating a memory card comprising a temperature sensor in an example of the present disclosure.

In one example shown in FIG. 3, a memory card 300 comprises a memory controller 106 and a memory device 104. The memory card 300 may comprise a Personal Computer Memory Card International Association (PCMCIA) card, a CF card, a Smart Media (SM) card, a memory stick, a multimedia card, an SD card, a Universal Flash Memory (UFS) card, etc. The memory card 300 may further comprise a memory card connector 302 coupling the memory card 300 with a host (e.g., the host 108 shown in FIG. 1).

For the memory card 300 shown in FIG. 3, a temperature sensor 200 needs to be disposed in the memory card 300, and a temperature of the memory device 104 is monitored, such that the memory controller 106 records a memory space and a write temperature corresponding to writing of data to the memory device 104 in response to the temperature of the memory device 104 meeting a second temperature condition (a low temperature or a high temperature), and/or acquires a memory space and a write temperature corresponding to to-be-rewritten data in the memory device 104 in response to the temperature of the memory device 104 meeting a first temperature condition (a suitable temperature), and performs a rewrite operation on the to-be-rewritten data according to the memory space and the write temperature corresponding to the to-be-rewritten data.

Figure 4:
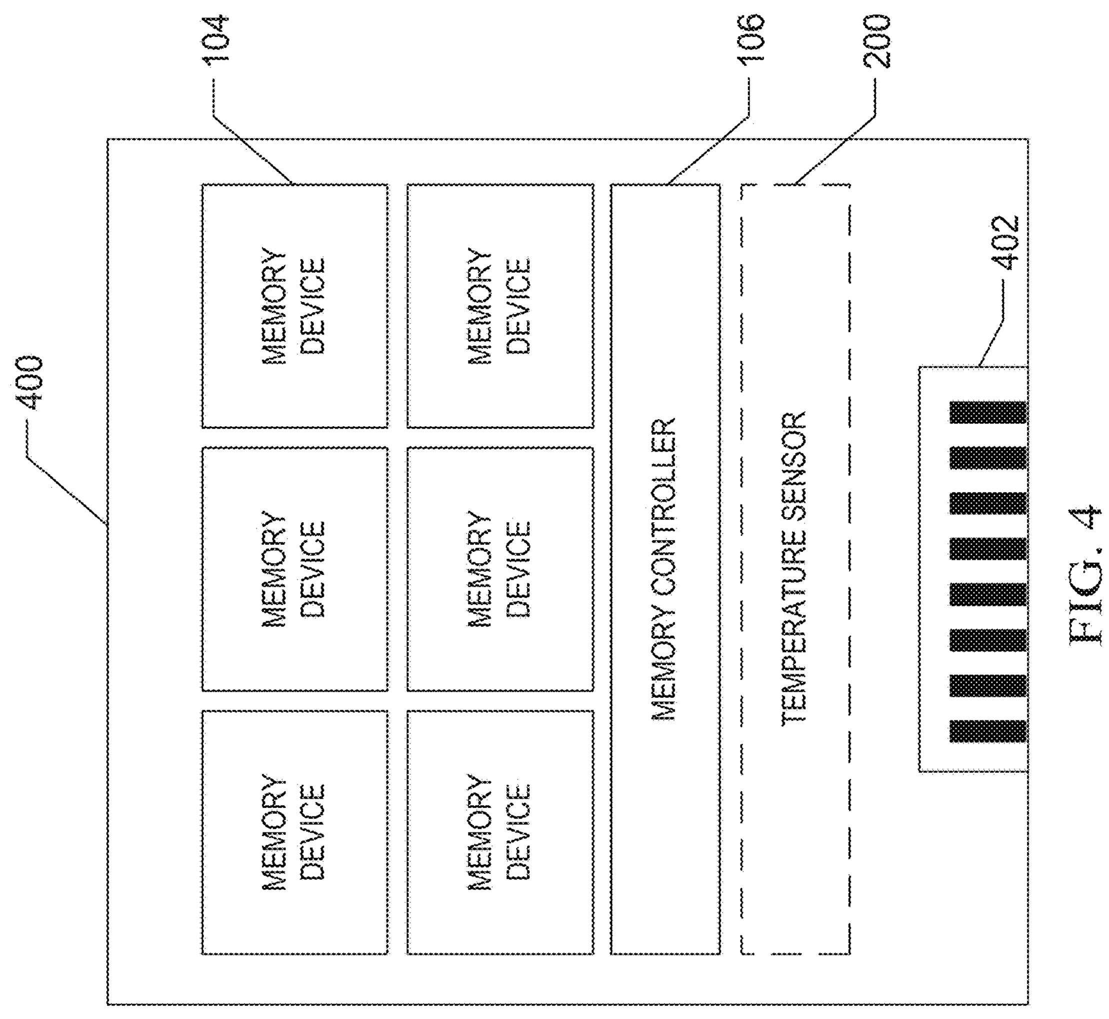
FIG. 4 is a schematic diagram illustrating a solid-state drive comprising a temperature sensor in an example of the present disclosure.

In another example shown in FIG. 4, a solid state drive 400 comprises a memory controller 106 and a plurality of memory devices 104. In this example, the solid state drive 400 may further comprise the solid state drive 400 and a solid state drive connector 402 coupled with a host (e.g., the host 108 shown in FIG. 1).

For the solid state drive 400 shown in FIG. 4, a temperature sensor 200 is disposed in the solid state drive 400, and a temperature of each of the memory devices 104 is monitored, such that the memory controller 106 records a memory space and a write temperature corresponding to writing of data to the memory device 104 in response to the temperature of the memory device 104 meeting a second temperature condition (a low temperature or a high temperature), and/or acquires a memory space and a write temperature corresponding to to-be-rewritten data in the memory device 104 in response to the temperature of the memory device 104 meeting a first temperature condition (a suitable temperature), and performs a rewrite operation on the to-be-rewritten data according to the memory space and the write temperature corresponding to the to-be-rewritten data.

Figure 5:
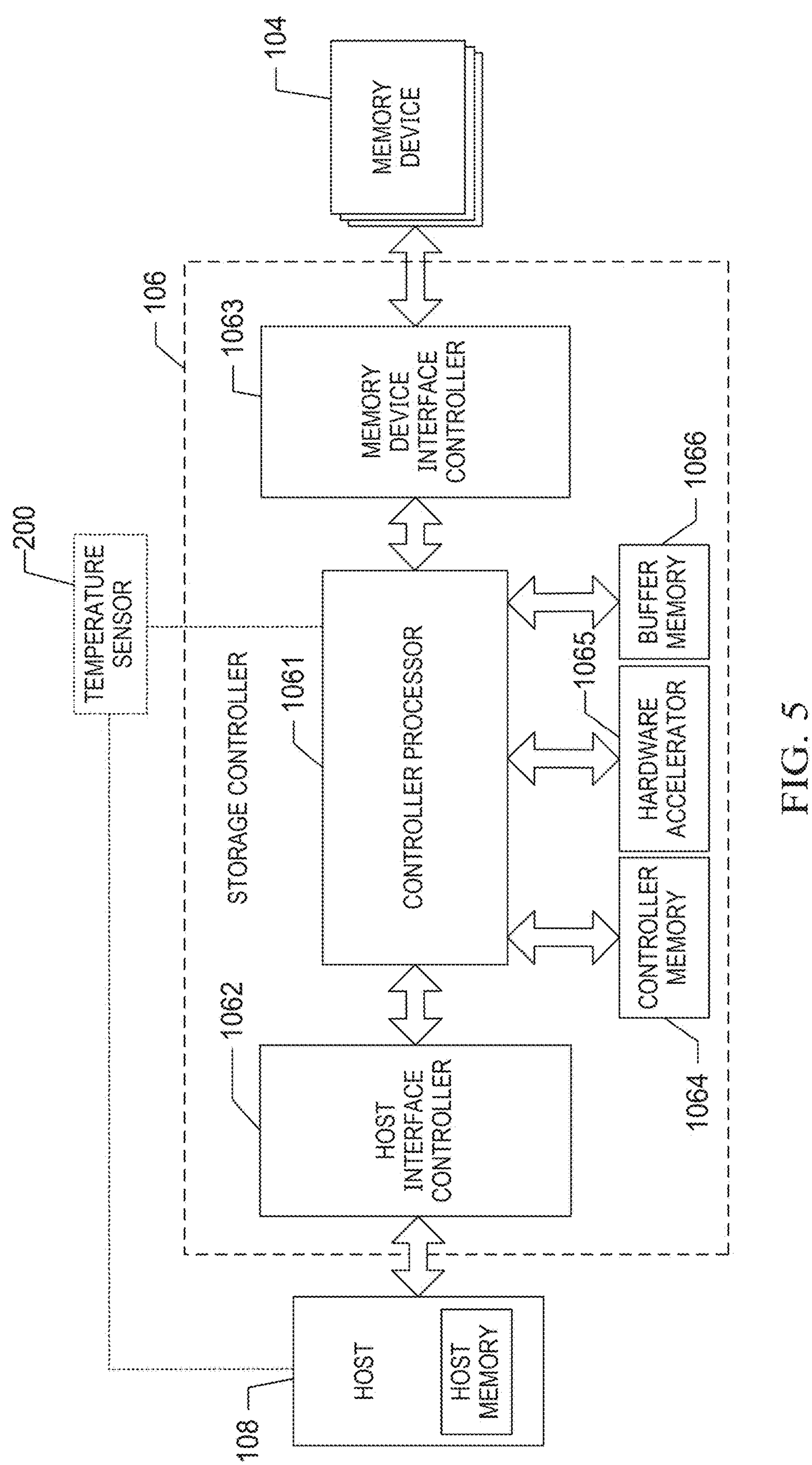
FIG. 5 is a schematic diagram illustrating a memory controller in an example of the present disclosure.

FIG. 5 is a schematic diagram illustrating a memory controller in an example of the present disclosure. As shown in FIG. 5, the memory controller 106 is respectively coupled and connected with a host 108 and one or more memory devices 104, and is configured to control sending of data from the host 108 to the memory device 104 or reading of data from the memory device 104 and returning of the data to the host 108. The memory controller 106 at least comprises a controller processor 1061, a host interface controller 1062, a memory device interface controller 1063, a controller memory 1064, a hardware accelerator 1065, and a buffer memory 1066.

The controller processor 1061 is a core part of the memory controller 106, is configured to execute a control logic and an algorithm of the memory controller 106, and is used for processing functions such as command queuing, address mapping, garbage collection, data compression, input/output control, etc. In some examples, the controller processor 1061 may be implemented through an embedded processor or a Field-Programmable Gate Array (FPGA).

The host interface controller 1062 is respectively coupled with the host 108 and the controller processor 1061, is a communication interface component between the host 108 and the memory controller 106, and is responsible for data transmission between the host 108 and the memory controller 106, comprising read and write of data and receiving and sending of a command. The host interface controller typically supports various interfaces and protocols, and provides a data transmission function. The interfaces here comprise, but not limited to, a Serial Advanced Technology Attachment (SATA) interface and a Peripheral Component Interconnect Express (PCIe) interface. The protocols here comprise, but not limited to, an Advanced Host Controller Interface (AHCI) protocol and a Nonvolatile Memory Express (NVMe) protocol.

The memory device interface controller 1063 is respectively coupled with the memory device 104 and the controller processor 1061, is a communication interface component between the memory device 104 and the memory controller 106, and is responsible for implementing functions such as read, write, and erase of data, address mapping, etc.

The controller memory 1064 is coupled with the controller processor 1061, is a memory region for storing instructions and data, and may provide quick read and write operations and a real-time control function. The controller memory 1064 typically employs a memory medium such as a Not OR (NOR) flash memory, a Not AND (NAND) flash memory, or a Random-Access Memory (RAM), etc.

The hardware accelerator 1065 is coupled with the controller processor 1061, and is a component for optimizing some example operations. The hardware accelerator uses a hardware logical circuit to optimize the performance of some example operations, so as to improve the performance and data security of the memory device. For example, the hardware accelerator may be used for processing tasks such as encryption, decryption, compression, decompression, error correction codec, etc. In addition, the hardware accelerator may be used for improving operations such as data search and sorting, etc.

The buffer memory 1066 is coupled with the controller processor 1061, is a component used for temporarily storing data, and may be further configured to buffer instructions and data. The buffer memory typically employs a high-speed memory device such as a Dynamic Random-Access Memory (DRAM), a Static Random-Access Memory (SRAM), etc., to improve the read and write performance of the memory controller and reduce latency.

The memory controller 106 is configured to receive a command from the host 108 and send a command to the host 108, and perform or implement various functions and operations provided in the present disclosure.

In some examples, the memory controller 106 has a Flash Translation Layer (FTL), and may perform one or more command operations, internal operations, etc. through the FTL. For example, the memory controller 106 may control the memory device 104 in response to a request from the host 108. In addition, the memory controller 106 may perform the internal operations (e.g., a garbage collection operation, a read recovery operation, and a wear leveling operation) unrelated to the request from the host 108. For example, the memory controller 106 may perform the above operations by using software to run the FTL. The FTL may be run by the controller processor 1061 of the memory controller 106. Accordingly, individual operations of the FTL may be performed by the controller processor 1061. One important operation of the FTL is completing the mapping from a Logical Address (LA) space of the host 108 to a Physical Address (PA) space of the memory device 104. Every time the memory controller 106 writes user data to the memory device 104, the mapping from a logical address of the user data to a physical address of the user data in the memory device 340 is recorded. When the host 108 reads the data, the memory controller 106 reads the data from the memory device 104 according to the mapping and then returns the data to the host 108.

In some examples, the host 108 may comprise a host memory 1081, and synchronize all or part of Logical to Physical (L2P) mapping tables in a memory system 102 to the host memory 1081, such that an address mapping operation can be performed preferentially in the host 108, thereby improving the performance of the memory system 1002. For example, the host 108 transmits L2P mapping information searched from the host memory 1081 along with a read command to the memory system 102. The host interface controller 1062 receives the read command and the L2P mapping information. The controller processor 1061 transmits the read command for reading user data and a physical address corresponding to the read command to the memory device 104 together. The memory device 104 reads the user data corresponding to the received read command. The read user data may be transferred to the memory controller 106 and may be transmitted from the memory controller 106 to the host 108.

In examples of the present disclosure, when the memory device 104 meets a second temperature condition (a low temperature or a high temperature), a memory space and a write temperature corresponding to writing of the data to the memory device 104 need to be recorded, such that when a temperature of the memory device 104 meets a first temperature condition (a suitable temperature), a rewrite operation is performed on to-be-rewritten data according to the memory space and the write temperature corresponding to the to-be-rewritten data. As can be seen, when data is written to the memory device 104 at a low temperature or a high temperature, a memory space and a write temperature of writing data that are recorded by the memory controller 106 need to be placed in one reliable memory region independent of the memory device 104. In some examples, the memory space and the write temperature of writing data to the memory device 104 at a low temperature or a high temperature may be recorded in the host memory 1081. In some other examples, the memory space and the write temperature of writing data to the memory device 104 at a low temperature or a high temperature may be recorded in the controller memory 1064.

In some examples, the memory space and the write temperature of writing data to the memory device 104 at a low temperature may be recorded in a first list (a low temperature list), and the memory space and the write temperature of writing data to the memory device 104 at a high temperature may be recorded in a second list (a high temperature list), such that when the memory controller 106 controls the memory device 104 to perform a rewrite operation, the memory space and the write temperature corresponding to the to-be-rewritten data are read from at least one of the first list or the second list, to perform the rewrite operation on the to-be-rewritten data.

Further, in some examples, memory spaces recorded in the first list may be sorted in ascending order of write temperature, data of the corresponding memory spaces is sequentially read according to a sorting result, and the rewrite operation is performed; or memory spaces recorded in the second list may be sorted in descending order of write temperature, data of the corresponding memory spaces is sequentially read according to a sorting result, and the rewrite operation is performed. Through sorting, the rewrite operation may be preferentially performed on data with high risk (data written at the highest temperature or the lowest temperature).

Considering that the memory controller 106 controls the memory device 104 to write data in units of virtual blocks, in some examples, the memory space and the write temperature corresponding to the to-be-rewritten data may be recorded in units of virtual blocks in the first list and the second list.

The memory device 104 in examples of the present disclosure may be any type of memory device that can store data. In some examples, the memory device may be a memory device that stores data using a semiconductor technology, e.g., a NOT AND (NAND) memory device.

Figure 6:
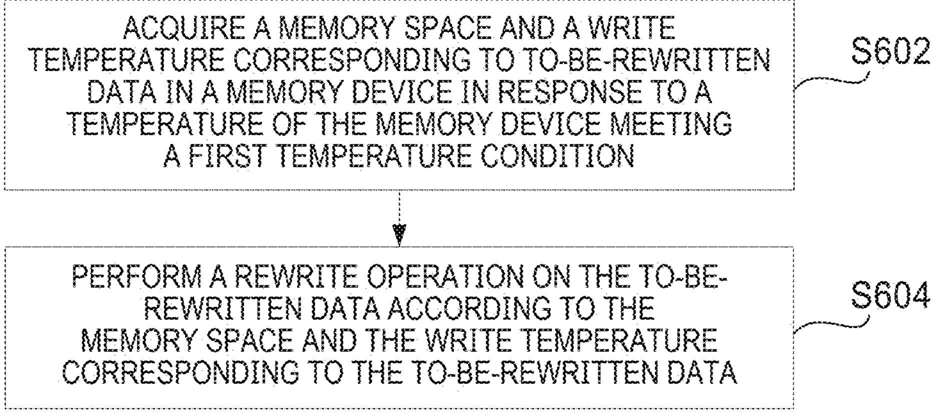
FIG. 6 is a flow diagram illustrating a method of operating a memory controller in an example of the present disclosure.

FIG. 6 is a flow diagram illustrating a method of operating a memory controller in an example of the present disclosure. As shown in FIG. 6, the method of operating the memory controller provided in examples of the present disclosure comprises the following operations:

Operation S602: Acquire a memory space and a write temperature corresponding to to-be-rewritten data in a memory device in response to a temperature of the memory device meeting a first temperature condition.

In examples of the present disclosure, the to-be-rewritten data may be any data that needs to be rewritten to the memory device. In some examples, the to-be-rewritten data is data written to the memory device at a second temperature condition (a low temperature or a high temperature). When data is written to the memory device at the second temperature condition, a memory space and a write temperature corresponding to to-be-rewritten data in the memory device are recorded, to make it convenient for the memory device to perform a rewrite operation at the first temperature condition. In one example, when the memory controller controls the memory device to write data in units of virtual blocks, an identifier of each virtual block and a write temperature corresponding to each virtual block are recorded.

The first temperature condition in examples of the present disclosure is a preconfigured temperature condition suitable for the memory device to read and write data (which is, for ease of description, referred to as a "suitable temperature" for short in examples of the present disclosure, and is a temperature within a certain temperature interval during example implementation). Data written to the memory device at a low temperature (which is, for ease of description, referred to as a "low temperature" for short in examples of the present disclosure, and is a temperature lower than a certain temperature threshold during example implementation) or a high temperature (which is, for ease of description, referred to as a "high temperature" for short in examples of the present disclosure, and is a temperature higher than a certain temperature threshold during example implementation) is rewritten to the memory device when the memory device is at a suitable temperature, to avoid that data written at a low temperature cannot be read at a high temperature or data written at a high temperature cannot be read at a low temperature.

Operation S604: Perform a rewrite operation on the to-be-rewritten data according to the memory space and the write temperature corresponding to the to-be-rewritten data.

In some examples, after acquiring the memory space and the write temperature corresponding to the to-be-rewritten data, the memory controller may rewrite the to-be-rewritten data from one or more virtual blocks to the memory device in units of virtual blocks. For data written to the memory device at a low temperature, when a write temperature is lower, the risk that the data fails to be read or is read incorrectly is higher. For data written to the memory device at a high temperature, when a write temperature is higher, the risk that the data fails to be read or is read incorrectly is higher. In consideration of this, further, in some examples, virtual blocks of the to-be-rewritten data may be sorted according to the magnitudes of write temperatures, and a rewrite operation is preferentially performed on to-be-rewritten data with a higher risk.

In one example, it may be configured that the first temperature condition is that a temperature difference between the temperature of the memory device and the write temperature exceeds a first temperature difference threshold. In this example, the first temperature difference threshold may be one preconfigured threshold, as long as the value of the threshold can enable the memory device to perform a rewrite operation at a relatively suitable temperature.

In one example, it may be configured that the first temperature condition is that the temperature difference between the temperature of the memory device and the write temperature exceeds the first temperature difference threshold and is less than a second temperature difference threshold. In this example, the second temperature difference threshold is also a preconfigured threshold, as long as the value of the threshold can keep a temperature difference value during cross-temperature data read and write of the memory device from exceeding a cross-temperature read-write capability supported by the memory device. In some examples, in a case that the cross-temperature read-write capability (a cross-temperature read-write temperature difference value supported during normal data read and write) supported by the memory device is known, it may be configured that the value of the second temperature difference threshold is less than or equal to a cross-temperature read-write temperature difference value (e.g., 120° C.) supported by the memory device.

In another example, it may be configured that the first temperature condition is that the temperature of the memory device is between a first threshold and a second threshold, wherein the second threshold is greater than the first threshold. In this example, the first threshold and the second threshold may be two preconfigured thresholds. The two thresholds can enable the memory device to read and write data at a suitable temperature. For example, a certain memory device has the highest accuracy of reading and writing data at 10° C.–20° C. It may be configured that the first threshold is 10° C., and the second threshold is 20° C. During example implementation, the rewrite operation of the to-be-rewritten data is performed as long as it is detected that the temperature of the memory device is between the first threshold and the second threshold. In this example, the rewrite operation of the to-be-rewritten data can be quickly performed without comparing the temperature of the memory device with the write temperature of the to-be-rewritten data.

In some examples, when the to-be-rewritten data is data that has been written when the temperature of the memory device meets the second temperature condition (a low temperature or a high temperature), the second temperature condition is configured, such that the memory device only records a memory space and a write temperature of writing data when the second temperature condition is met, and a corresponding memory space and write temperature do not need to be recorded for data that does not need to be rewritten, to avoid wasting a memory space. The data written to the memory device when the second temperature condition (a low temperature or a high temperature) is met is risky data (e.g., data written at a low temperature or a high temperature) that the memory device may fail to read or may read incorrectly, and a memory space and a write temperature of the risky data are recorded, such that a rewrite operation is performed when the memory device meets the first temperature condition, to enable rewritten data to be correctly read.

The second temperature condition here may be that the temperature of the memory device is less than a third threshold or greater than a fourth threshold, wherein the fourth threshold is greater than the third threshold, the third threshold is less than or equal to the first threshold, and the fourth threshold is greater than or equal to the second threshold. In this example, the third threshold and the fourth threshold may be two preconfigured thresholds. The third threshold may reflect data read and written when the memory device is at a low temperature, and the fourth threshold may reflect data read and written when the memory device is at a high temperature. For example, a certain memory device has low accuracy of reading and writing data at a temperature lower than −10° C. or higher than 25° C. It may be configured that the third threshold is −10° C., and the fourth threshold is 25° C.

Figure 7:
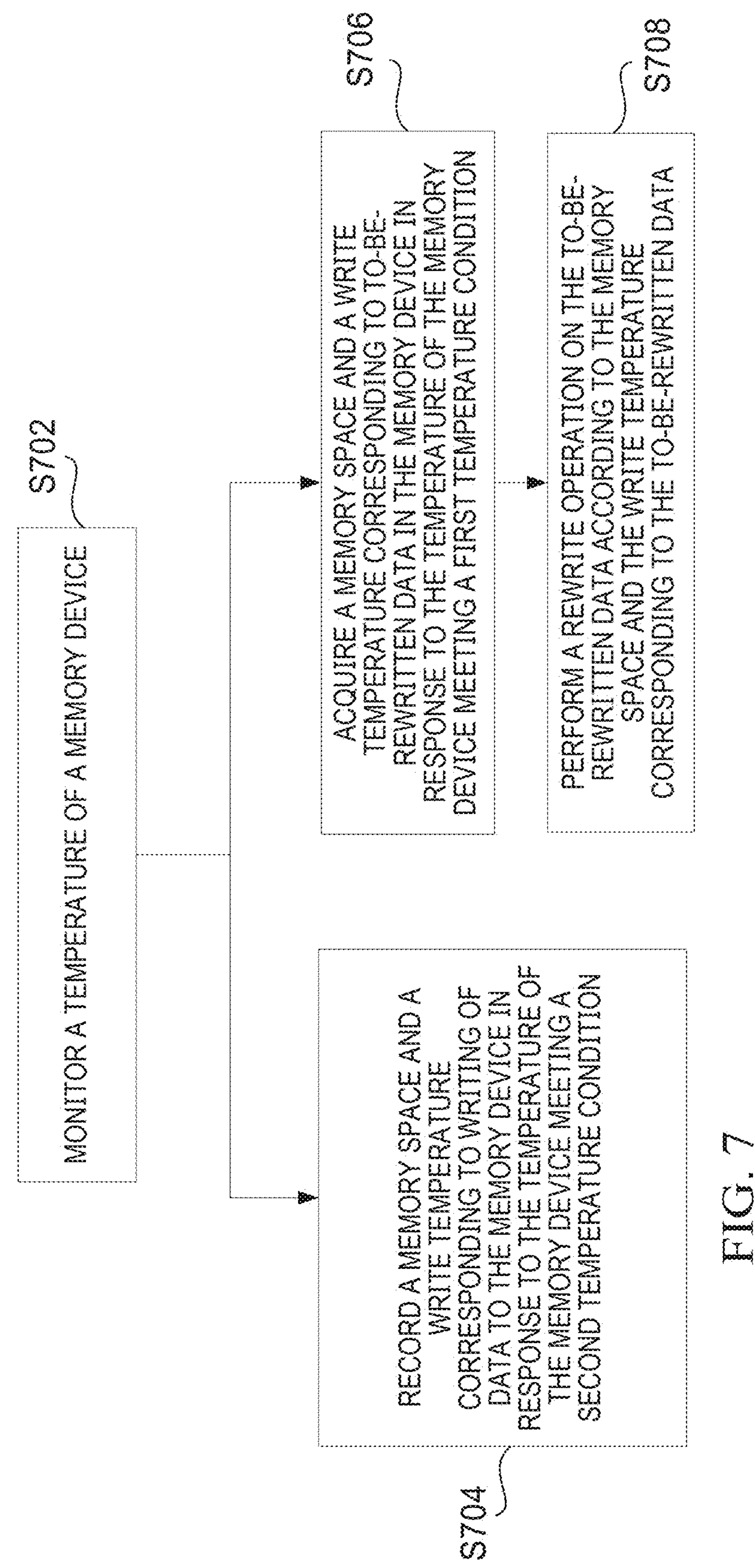
FIG. 7 is a flow diagram illustrating a method of operating a memory controller in another example of the present disclosure.

FIG. 7 is a flow diagram illustrating a method of operating a memory controller in another example of the present disclosure. As shown in FIG. 7, the method of operating the memory controller provided in examples of the present disclosure may comprise the following operations:

S702: Monitor a temperature of a memory device.

In Operation S702, the temperature of the memory device may be monitored by a host or a memory controller. If the temperature of the memory device is detected by the host, the host may send a command to the memory controller to inform the memory controller of a temperature condition that the memory device meets.

S704: Record a memory space and a write temperature corresponding to writing of data to the memory device in response to the temperature of the memory device meeting a second temperature condition.

In Operation S704, the second temperature condition is a preconfigured temperature condition (e.g., a low temperature condition of a temperature being lower than a temperature threshold or a high temperature condition of a temperature being higher than a temperature threshold) that may affect the read and write performance of the memory device. When it is detected that the temperature of the memory device meets the second temperature condition, while controlling the memory device to perform a data write operation, the memory controller records the memory space and the write temperature corresponding to writing of the data to the memory device. Since the data read-write performance of the memory device at the second temperature condition may be affected, the memory space and the write temperature of writing the data may be recorded in one memory region independent of the memory device, e.g., a controller memory of the memory controller or a host memory of the host.

S706: Acquire a memory space and a write temperature corresponding to to-be-rewritten data in the memory device in response to the temperature of the memory device meeting a first temperature condition.

In Operation S706, the first temperature condition is a preconfigured temperature condition (e.g., a temperature condition of a temperature being within a temperature interval) that is relatively suitable for reading and writing data of the memory device, and the to-be-rewritten data is data written to the memory device at the second temperature condition (a low temperature or a high temperature). When it is detected that the temperature of the memory device meets the first temperature condition, the memory space and the write temperature corresponding to the to-be-rewritten data in the memory device that are recorded are acquired, so as to perform a rewrite operation on the to-be-rewritten data.

S708: Perform a rewrite operation on the to-be-rewritten data according to the memory space and the write temperature corresponding to the to-be-rewritten data.

In Operation S708, the memory controller may control the memory device to perform the rewrite operation on all or part of data, or memory spaces may be sorted according to write temperatures, and rewrite operations are sequentially performed on data of the memory spaces according to a sorting result.

In the method of operating the memory controller provided in the foregoing example, a data recording operation and a data rewrite operation are automatically performed by monitoring the temperature of the memory device. When the temperature of the memory device meets the second temperature condition (a low temperature or a high temperature), the memory space and the write temperature corresponding to writing of the data to the memory device are automatically recorded; when the temperature of the memory device meets the first temperature condition (a suitable temperature), the memory space and the write temperature corresponding to the to-be-rewritten data in the memory device are automatically acquired; and the rewrite operation is performed on the to-be-rewritten data according to the memory space and the write temperature corresponding to the to-be-rewritten data.

Figure 8:
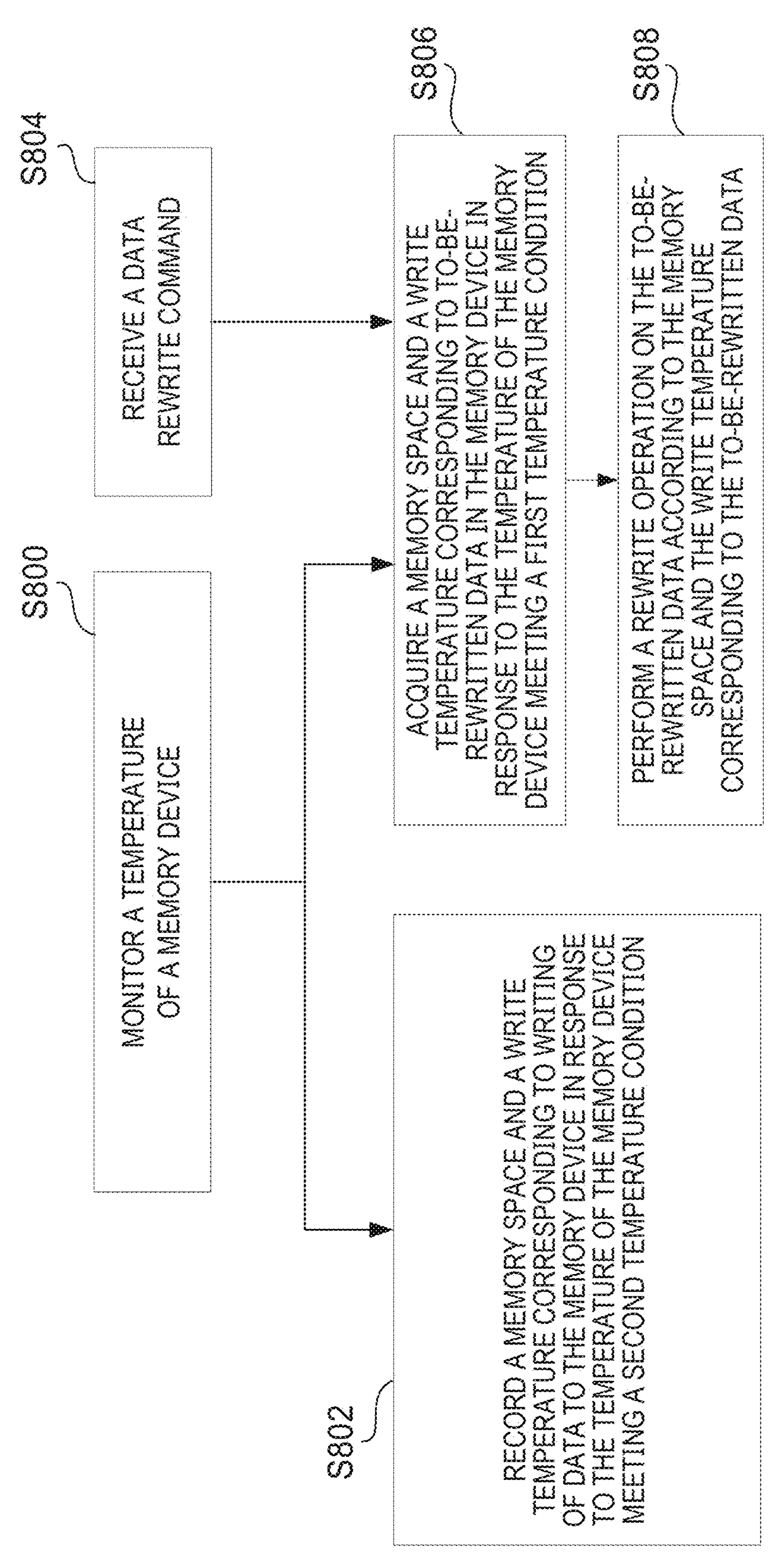
FIG. 8 is a flow diagram illustrating a method of operating a memory controller in still another example of the present disclosure.

FIG. 8 is a flow diagram illustrating a method of operating a memory controller in still another example of the present disclosure. As shown in FIG. 8, the method of operating the memory controller provided in examples of the present disclosure may comprise the following operations:

S800: Monitor a temperature of a memory device.

An example implementation of Operation S800 can refer to the foregoing description of Operation S702 above, which is no longer repeated here.

S802: Record a memory space and a write temperature corresponding to writing of data to the memory device in response to the temperature of the memory device meeting a second temperature condition.

An example implementation of Operation S802 can refer to the foregoing description of Operation S704, which is no longer repeated here.

S804: Receive a data rewrite command.

The data rewrite command in the above Operation S804 may be a preconfigured front-end command sent from a host to a memory controller. The front-end command is at least used for the memory controller to perform a rewrite operation on to-be-rewritten data when the temperature of the memory device meets a first temperature condition. The memory controller performs the rewrite operation of the memory device only after receiving the data rewrite command from the host, or otherwise does not control the memory device to perform the rewrite operation.

S806: Acquire a memory space and a write temperature corresponding to to-be-rewritten data in the memory device in response to the temperature of the memory device meeting a first temperature condition.

An example implementation of Operation S806 can refer to the foregoing description of Operation S706, which is no longer repeated here.

S808: Perform a rewrite operation on the to-be-rewritten data according to the memory space and the write temperature corresponding to the to-be-rewritten data.

An example implementation of Operation S808 can refer to the foregoing description of Operation S708, which is no longer repeated here.

In the method of operating the memory controller provided in the foregoing example, a data recording operation may be automatically performed by monitoring the temperature of the memory device. However, the data rewrite command needs to be received before a data rewrite operation is performed. The temperature of the memory device is monitored, and when the temperature of the memory device meets the second temperature condition (a low temperature or a high temperature), the memory space and the write temperature corresponding to writing of the data to the memory device are automatically recorded. After the data rewrite command is received, the memory space and the write temperature corresponding to the to-be-rewritten data in the memory device are acquired in response to the temperature of the memory device meeting the first temperature condition, and the rewrite operation is performed on the to-be-rewritten data according to the memory space and the write temperature corresponding to the to-be-rewritten data.

Figure 9:
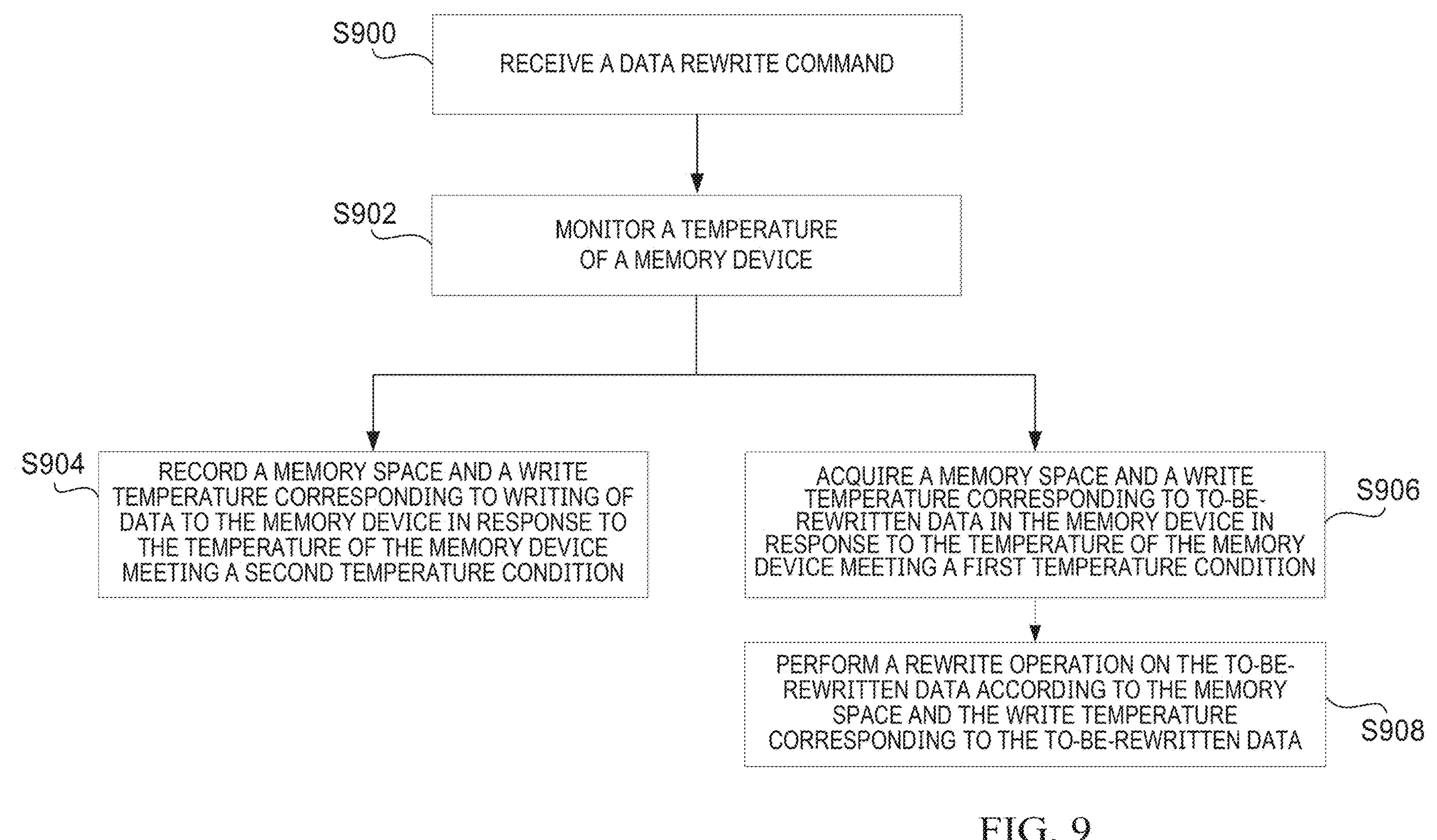
FIG. 9 is a flow diagram illustrating a method of operating a memory controller in yet another example of the present disclosure.

FIG. 9 is a flow diagram illustrating a method of operating a memory controller in yet another example of the present disclosure. As shown in FIG. 9, the method of operating the memory controller provided in examples of the present disclosure may comprise the following operations:

S900: Receive a data rewrite command.

The data rewrite command in the above Operation S900 may also be a front-end command sent from a host to a memory controller. In addition to being used for the memory controller to perform a rewrite operation on to-be-rewritten data when a temperature of a memory device meets a first temperature condition, the front-end command may be used for the memory controller to record a memory space and a write temperature corresponding to writing of data to the memory device when the temperature of the memory device meets a second temperature condition. The memory controller records the memory space and the write temperature corresponding to writing of the data to the memory device when the temperature of the memory device meets the second temperature condition and performs the rewrite operation of the memory device when the temperature of the memory device meets the first temperature condition only after receiving the data rewrite command from the host.

S902: Monitor a temperature of a memory device.

An example implementation of Operation S902 can refer to the foregoing description of Operation S702, which is no longer repeated here.

S904: Record a memory space and a write temperature corresponding to writing of data to the memory device in response to the temperature of the memory device meeting a second temperature condition.

An example implementation of Operation S904 can refer to the foregoing description of Operation S704, which is no longer repeated here.

S906: Acquire a memory space and a write temperature corresponding to to-be-rewritten data in the memory device in response to the temperature of the memory device meeting a first temperature condition.

An example implementation of Operation S906 can refer to the foregoing description of Operation S706, which is no longer repeated here.

S908: Perform a rewrite operation on the to-be-rewritten data according to the memory space and the write temperature corresponding to the to-be-rewritten data.

An example implementation of Operation S908 can refer to the foregoing description of Operation S708, which is no longer repeated here.

In the method of operating the memory controller provided in the foregoing example, the data rewrite command needs to be received before a data recording operation and a data rewrite operation are performed. After one data rewrite command is received, the temperature of the memory device is monitored; when the temperature of the memory device meets the second temperature condition (a low temperature or a high temperature), the memory space and the write temperature corresponding to writing of the data to the memory device are recorded; when the temperature of the memory device meets the first temperature condition, the memory space and the write temperature corresponding to the to-be-rewritten data in the memory device are acquired; and the rewrite operation is performed on the to-be-rewritten data according to the memory space and the write temperature corresponding to the to-be-rewritten data.

In some examples, the memory space and the write temperature corresponding to the to-be-rewritten data in the examples of the present disclosure may be stored in a host memory of the host. In some other examples, the memory space and the write temperature corresponding to the to-be-rewritten data in the examples of the present disclosure may be stored in a controller memory of the memory controller.

In some examples, recording the memory space and the write temperature corresponding to the to-be-rewritten data in response to the temperature of the memory device meeting the second temperature condition may comprise the following operations: recording the memory space and the write temperature corresponding to writing of the data to the memory device in a first list in response to the temperature of the memory device being less than a third threshold; and recording the memory space and the write temperature corresponding to writing of the data to the memory device in a second list in response to the temperature of the memory device being greater than a fourth threshold.

In some other examples, performing the rewrite operation on the to-be-rewritten data according to the memory space and the write temperature corresponding to the to-be-rewritten data may comprise: reading the memory space and the write temperature corresponding to the to-be-rewritten data from at least one of the first list or the second list, and performing the rewrite operation on the to-be-rewritten data.

In still some other examples, reading the memory space and the write temperature corresponding to the to-be-rewritten data from at least one of the first list or the second list, and performing the rewrite operation on the to-be-rewritten data may comprise, but not limited to, at least one of the following:

(1) sorting memory spaces recorded in the first list in ascending order of write temperature, sequentially reading data of the corresponding memory spaces according to a sorting result, and performing the rewrite operation; and (2) sorting memory spaces recorded in the second list in descending order of write temperature, sequentially reading data of the corresponding memory spaces according to a sorting result, and performing the rewrite operation.

In some examples, the memory space and the write temperature corresponding to the to-be-rewritten data is recorded in units of virtual blocks in the first list and the second list.

For a memory device (especially a semiconductor memory device), data written at a high temperature may be read incorrectly at a low temperature, and data written at a low temperature may also be read incorrectly at a high temperature. If the memory device needs to read and write data normally, it is required that a temperature difference value (e.g., a temperature difference value between a write temperature of writing data to the memory device and a read temperature of reading the data) of cross-temperature data read and write should not exceed a cross-temperature read-write temperature difference (for example, a cross-temperature, used for reflecting a cross-temperature read-write capability of the memory device) supported by the memory device, and different memory devices may support different cross-temperature read-write temperature differences.

Figures 10, 11:
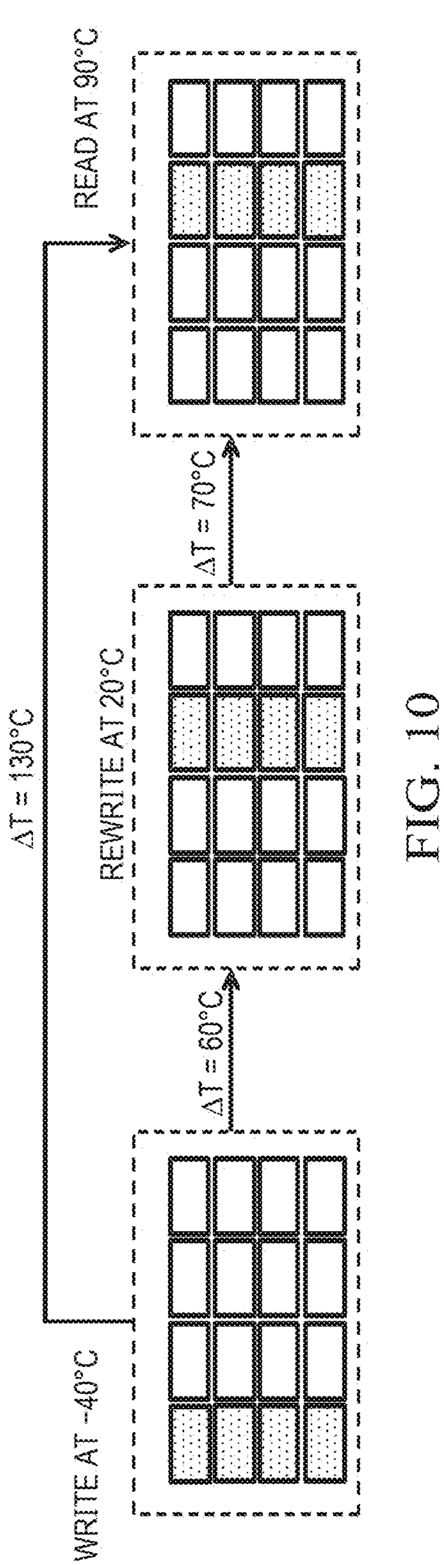
FIG. 10 is a schematic diagram illustrating a temperature difference of cross-temperature data read and write in an example of the present disclosure.
FIG. 11 is a schematic diagram illustrating a list recording a memory space and a write temperature in an example of the present disclosure.

In the method of operating the memory controller provided in examples of the present disclosure, data written to the memory device at the second temperature condition (a low temperature or a high temperature) is rewritten at the first temperature condition (a suitable temperature), the temperature difference of cross-temperature data read and write can be kept from exceeding the cross-temperature read-write temperature difference (the cross-temperature x-temp) supported by the memory device. As shown in FIG. 10, data is written at a low temperature of −40° C., the data is read at a high temperature of 90° C., and a cross-temperature read-write temperature difference is $\Delta T$=130° C. (exceeding the cross-temperature read-write temperature difference supported by the memory device being 120° C.). At 20° C., the data written at the low temperature of −40° C. is rewritten once (during the rewrite, a temperature difference value between the read temperature and the write temperature is $\Delta T$=60° C., and does not exceed the cross-temperature read-write temperature difference supported by the memory device being 120° C.). When the data is read at the high temperature of 90° C., a read-write temperature difference value is $\Delta T$=70° C., and does not exceed the cross-temperature read-write temperature difference supported by the memory device being 120° C. As can be seen, through the method of operating the memory controller provided in the examples of the present disclosure, the cross-temperature read-write capability of the memory device can be improved.

Some memory devices with poorer cross-temperature read-write temperature difference capabilities may support smaller cross-temperature read-write temperature differences (cross-temperatures x-temp). For example, for some electronic devices, data written at 25° C. indoors (e.g., data of a user on a mobile game APP) may fail to be read at −30° C. outdoors (the user opens the game again outdoors). Alternatively, a photo taken by a user at −30° C. outdoors may fail to be normally displayed at 25° C. indoors.

In the method of operating the memory controller provided in examples of the present disclosure, two lists shown in FIG. 11 are maintained. A low temperature list records a memory space and a write temperature of writing data to the memory device at a low temperature, and a high temperature list records a memory space and a write temperature of writing data to the memory device at a high temperature. In some examples, the high temperature list and the low temperature list may record corresponding temperatures in units of Virtual Blocks (VB). In an example, as shown in FIG. 11, the low temperature list records that write temperatures corresponding to virtual blocks VB1, VB2, VB3, and VB4 are respectively −40° C., −20° C., −20° C., and −10° C. The high temperature list records that write temperatures corresponding to virtual blocks $VB_{100}$, $VB_{101}$, $VB_{103}$, and $VB_{104}$ are respectively 35° C., 30° C., 30° C., and 25° C.

During example implementation, the virtual blocks in the high temperature list may be sorted in descending order of temperature, and the virtual blocks in the low temperature list may be sorted in ascending order of temperature, such that when a rewrite operation is performed, a virtual block with the highest risk (a virtual block with the highest temperature in the high temperature list and a virtual block with the lowest temperature in the low temperature list) is selected to perform a rewrite each time.

Figure 12:
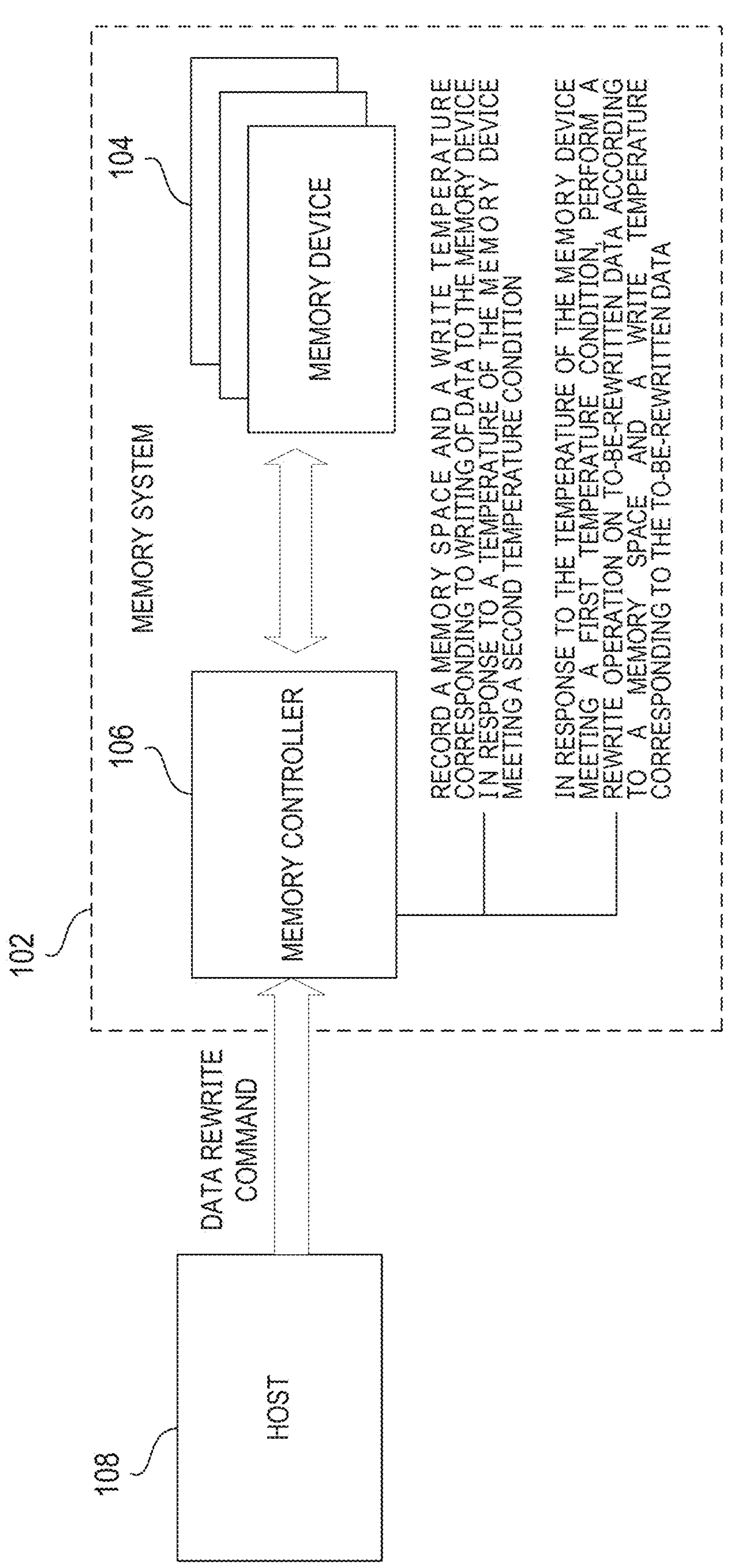
FIG. 12 is a schematic diagram illustrating an example memory system in an example of the present disclosure.

FIG. 12 is a schematic diagram illustrating an example memory system in an example of the present disclosure. As shown in FIG. 12, the memory system comprises: a host 108, a memory controller 106, and a memory device 104, wherein the memory controller 106 is coupled with the memory device 104; the host 108 is configured to send a data rewrite command to the memory controller 106; and the memory controller 106 is configured to: after receiving the data rewrite command from the host, acquire a memory space and a write temperature corresponding to to-be-rewritten data in the memory device 104 in response to a temperature of the memory device 104 meeting a first temperature condition, and perform a rewrite operation on the to-be-rewritten data according to the memory space and the write temperature corresponding to the to-be-rewritten data.

In some examples, the to-be-rewritten data is data that has been written when the temperature of the memory device 104 meets a second temperature condition; and the memory controller 106 may be further configured to: record a memory space and a write temperature corresponding to writing of data to the memory device 104 in response to the temperature of the memory device 104 meeting the second temperature condition.

Figure 13:
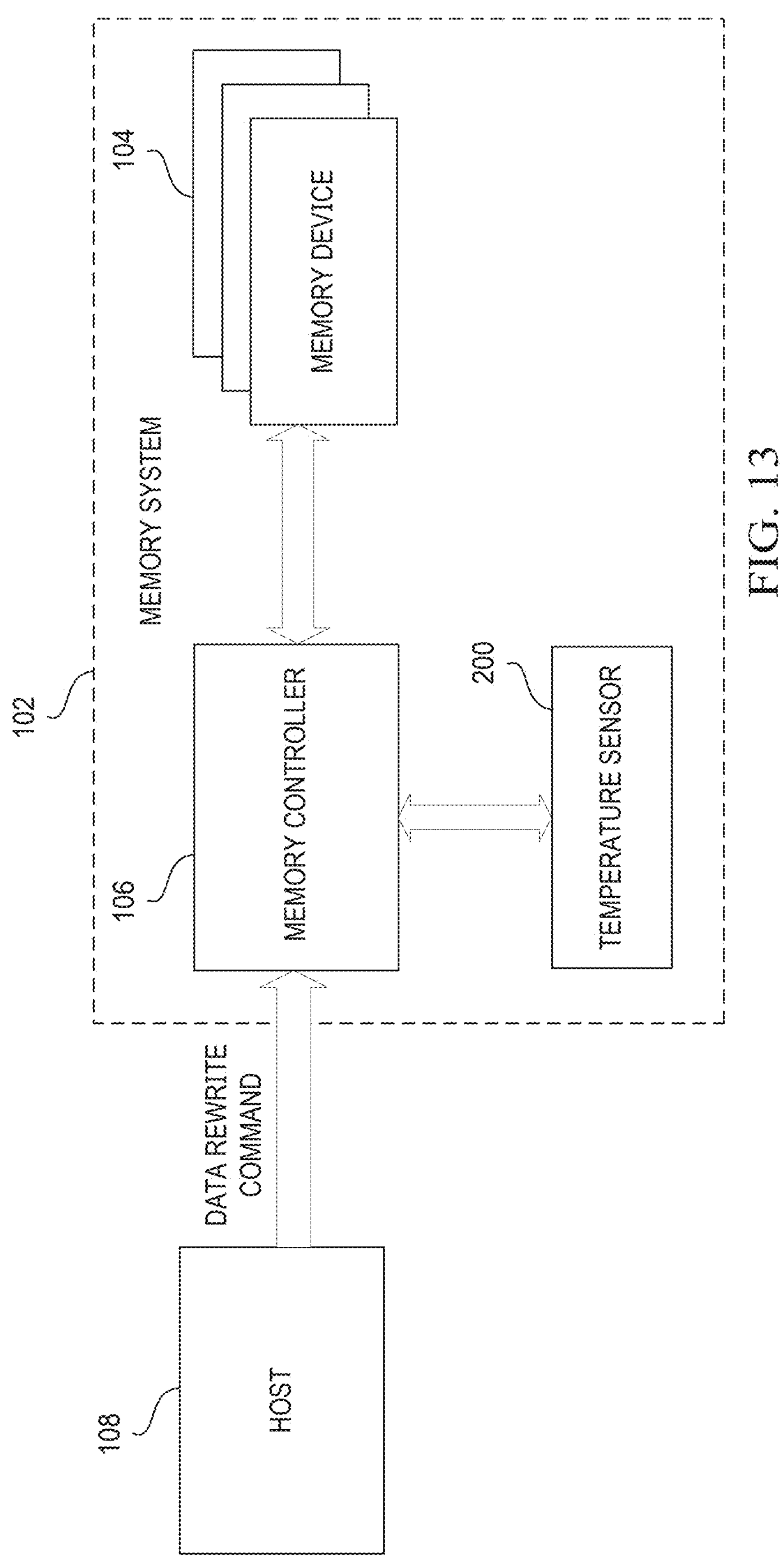
FIG. 13 is a schematic diagram illustrating an example memory system in an example of the present disclosure.

FIG. 13 is a schematic diagram illustrating an example memory system in an example of the present disclosure. As shown in FIG. 13, the memory system may comprise: a memory device 104; and a memory controller 106 coupled to the memory device, wherein the memory controller 106 is configured to: acquire a memory space and a write temperature corresponding to to-be-rewritten data in response to a temperature of the memory device meeting a first temperature condition; and perform a rewrite operation on the to-be-rewritten data according to the memory space and the write temperature corresponding to the to-be-rewritten data.

In some examples, the memory system in the foregoing example may further comprise: a temperature sensor 200, connected with the memory controller 106, and configured to monitor the temperature of the memory device 104.

In some examples, the to-be-rewritten data may be data that has been written when the temperature of the memory device 104 meets a second temperature condition.

Further, in some examples, the memory controller 106 may be further configured to record the memory space and the write temperature corresponding to the to-be-rewritten data in response to the temperature of the memory device 104 meeting the second temperature condition.

In some examples, the memory system in the above example further comprises: a host 108, connected with the memory controller 106, and configured to send a data rewrite command to the memory controller 106, to enable the memory controller 106 to perform the rewrite operation on the to-be-rewritten data in the memory device when the temperature of the memory device 104 meets the first temperature condition.

Figure 14:
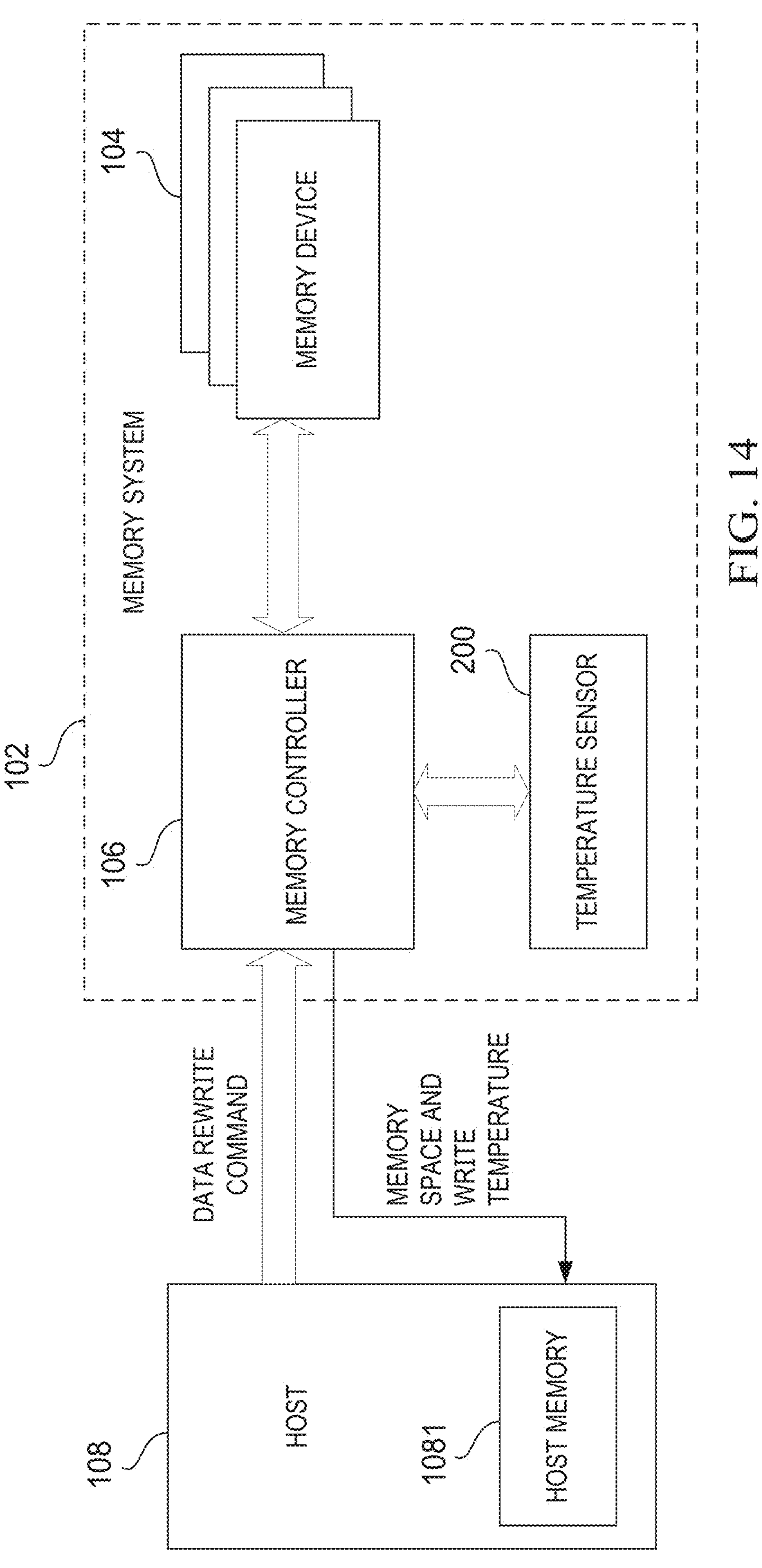
FIG. 14 is a schematic diagram illustrating an example memory system in another example of the present disclosure.

FIG. 14 is a schematic diagram illustrating an example memory system in another example of the present disclosure. As shown in FIG. 14, a host 108 may comprise a host memory 1081, and a memory controller 106 may record a memory space and a write temperature corresponding to to-be-rewritten data in the host memory 1081.

Figure 15:
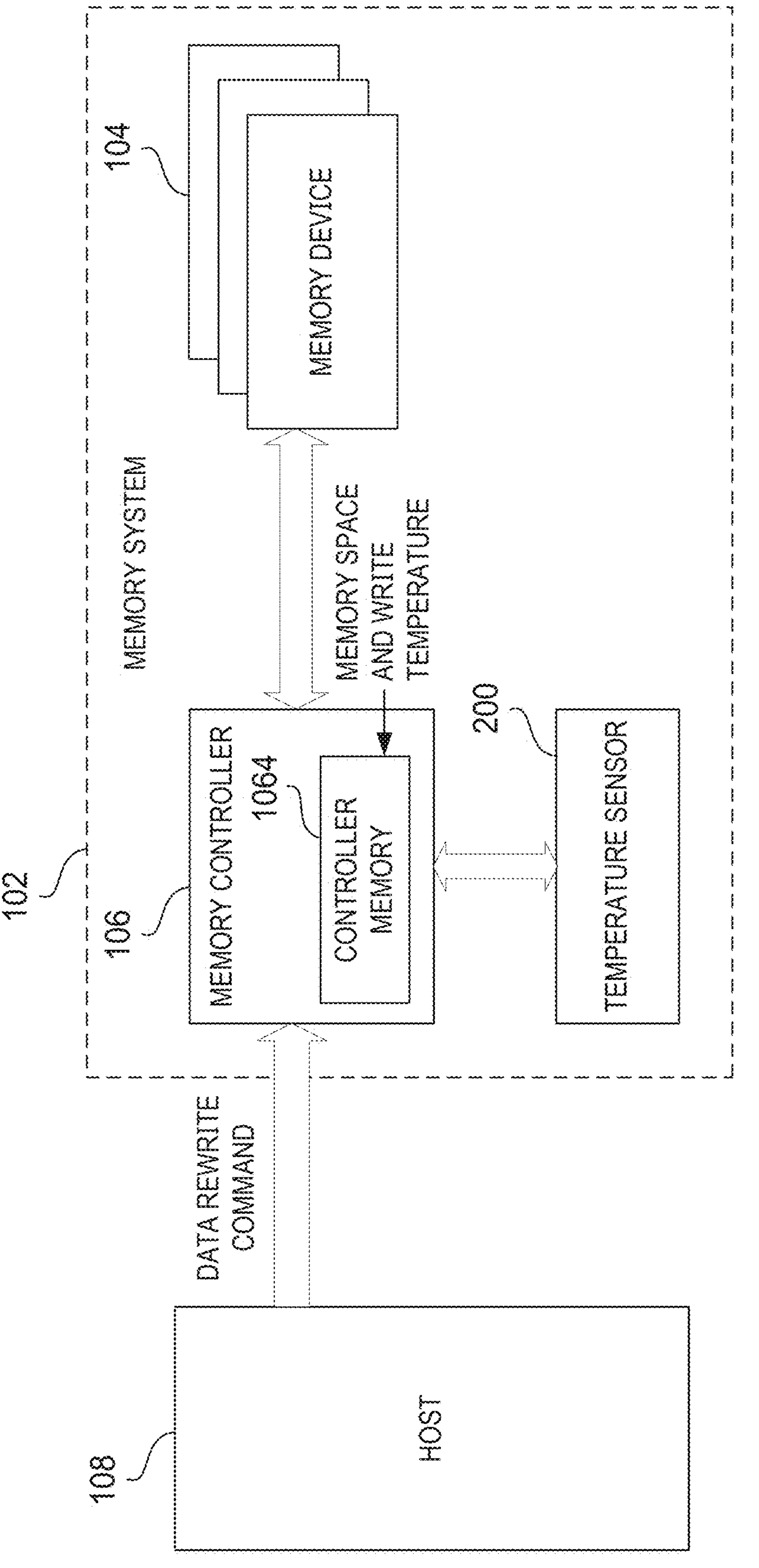
FIG. 15 is a schematic diagram illustrating an example memory system in still another example of the present disclosure.

FIG. 15 is a schematic diagram illustrating an example memory system in still another example of the present disclosure. As shown in FIG. 15, a memory controller 106 may comprise: a controller memory 1064, and the memory controller 106 may record a memory space and a write temperature corresponding to to-be-rewritten data in the controller memory 1064.

Figure 16:
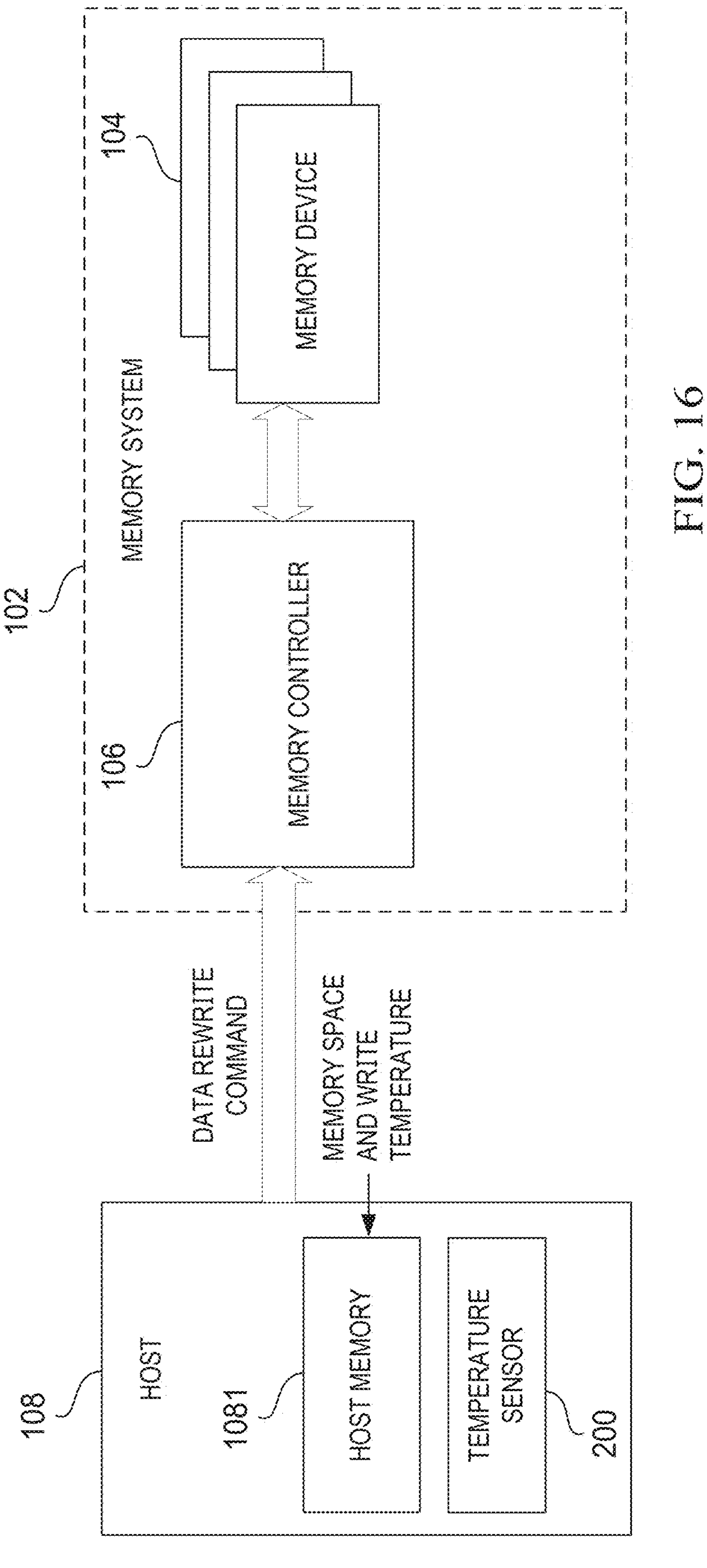
FIG. 16 is a schematic diagram illustrating an example memory system in yet another example of the present disclosure.

FIG. 16 is a schematic diagram illustrating an example memory system in yet another example of the present disclosure. As shown in FIG. 16, a temperature sensor 200 on a host 108 may monitor a temperature of a memory device 104, and a memory space and a write temperature corresponding to to-be-rewritten data are recorded in a host memory 1081 through the host.

In some examples, examples of the present disclosure further provide an electronic device. The electronic device may comprise the memory system described in any above example.

In some examples, examples of the present disclosure further provide a solid state drive. Referring to FIG. 4, the solid state drive 400 may comprise: a flash memory (a memory device 104); and a flash memory controller (a memory controller 106) connected with the flash memory (the memory device 104), wherein the flash memory controller is configured to: acquire a memory space and a write temperature corresponding to to-be-rewritten data in response to a temperature of the flash memory meeting a first temperature condition; and perform a rewrite operation on the to-be-rewritten data according to the memory space and the write temperature corresponding to the to-be-rewritten data.

In some examples, the solid state drive provided in examples of the present disclosure may further comprise: a temperature sensor 200, connected with the flash memory controller (the memory controller 106), and configured to monitor the temperature of the flash memory (the memory device 104).

Examples of the present disclosure further provide a memory controller. The memory controller comprises: a memory device interface, configured to connect a memory device; and a controller processor, connected with the memory device interface, and configured to: acquire a memory space and a write temperature corresponding to to-be-rewritten data in the memory device in response to a temperature of the memory device meeting a first temperature condition; and perform a rewrite operation on the to-be-rewritten data according to the memory space and the write temperature corresponding to the to-be-rewritten data.

In some examples, the memory controller provided in examples of the present disclosure further comprises: a controller memory, connected with the controller processor, and configured to store the memory space and the write temperature corresponding to the to-be-rewritten data that are recorded.

In some examples, the to-be-rewritten data may be data that has been written when the temperature of the memory device meets a second temperature condition.

In some examples, the memory controller provided in examples of the present disclosure may be further configured to: record a memory space and a write temperature corresponding to writing of data to the memory device in response to the temperature of the memory device meeting the second temperature condition.

Examples of the present disclosure further provide a host device, comprising: a command sending module, configured to send a data rewrite command to a memory controller, to enable the memory controller to acquire a memory space and a write temperature corresponding to to-be-rewritten data in a memory device in response to a temperature of the memory device meeting a first temperature condition, and perform a rewrite operation on the to-be-rewritten data according to the memory space and the write temperature corresponding to the to-be-rewritten data.

In some examples, the to-be-rewritten data may be data that has been written when the temperature of the memory device meets a second temperature condition.

In some examples, the host device provided in examples of the present disclosure may be further configured to: record a memory space and a write temperature corresponding to writing of data to the memory device in response to the temperature of the memory device meeting the second temperature condition.

In some examples, the host device provided in examples of the present disclosure may comprise: a host memory, configured to store the memory space and the write temperature corresponding to the to-be-rewritten data that are recorded.

Examples of the present disclosure provide a non-transitory computer-readable memory medium, having a computer instruction stored thereon, wherein the computer instruction, when being run, performs any above operation method of a memory system. The computer instruction is suitable for being loaded by a processor and performing the operation method of the memory system provided in the operations in any above example. For details, refer to the implementation provided for the operations in any above example, which are not described herein again. In addition, for the description of the beneficial effects of using the same method, details are also not described herein again. Technical details undisclosed in the examples of the computer-readable memory medium involved in the present disclosure may be referred to the descriptions about the method examples of the present disclosure. As an example, the computer program may be deployed on one computer device for execution, or on a plurality of computer devices at one site for execution, or distributed on a plurality of computer devices interconnected through a communication network at a plurality of sites for execution.

Examples of the present disclosure further provide a computer program product or a computer program. The computer program product or the computer program comprises a computer instruction, and the computer instruction is stored in a computer-readable memory medium. A processor of a computer device reads the computer instruction from the computer-readable memory medium, and the processor executes the computer instruction, to make the computer device perform the method provided in various example manners in any above example.

Those of ordinary skill in the art can recognize that the means and algorithm operations of various examples as described in conjunction with the examples disclosed herein can be implemented in electronic hardware, computer software, or a combination of both. To clearly describe the interchangeability of hardware and software, the compositions and operations of the examples have been generally described according to functions in the description. Whether these functions are performed by means of a hardware or a software depends on particular applications and design constraints of the technical solution. Professional technicians can implement the described function using different methods for each particular application, but such implementation should not be considered as exceeding the scope of the present disclosure.

The methods and related apparatuses provided in examples of the present disclosure are described with reference to the method flowcharts and/or the schematic structural diagrams provided in examples of the present disclosure. Computer program instructions may be used to implement each process and/or block in the method flowcharts and/or the schematic structural diagrams and a combination of a process and/or a block in the flowcharts and/or the block diagrams. These computer program instructions may be provided for a processor of a general-purpose computer, a dedicated computer, an embedded processor, or another programmable application display device to generate a machine, so that the instructions executed by the processor of the computer or the other programmable application display device generate an apparatus for implementing example functions in one or more processes in the flowcharts and/or in one or more blocks in the schematic structural diagrams. These computer program instructions may be stored in a computer-readable memory that can instruct the computer or the other programmable application display device to work in an example manner, so that the instructions stored in the computer-readable memory generate an artifact that comprises an instruction apparatus. The instruction apparatus implements example functions in one or more processes in the flowcharts and/or in one or more blocks in the schematic structural diagrams. These computer program instructions may also be loaded onto a computer or another programmable application display device, so that a series of operations and steps are performed on the computer or the other programmable device, thereby generating computer-implemented processing. Therefore, the instructions executed on the computer or the other programmable device provide steps for implementing example functions in one or more processes in the flowcharts and/or in one or more blocks in the schematic structural diagrams.

A person skilled in the art can easily figure out another implementation solution of the present disclosure after considering this specification and practicing the disclosure that is disclosed herein. The present disclosure is intended to cover any variations, uses, or adaptive changes of the disclosure. These variations, uses, or adaptive changes follow the general principles of the disclosure and comprise common general knowledge or conventional technical means in the art that are not disclosed herein. The description and the examples are to be regarded as being exemplary only. The true scope of the present disclosure are subject to the appended claims.

What is claimed is:

1. A method of operating a memory controller, comprising:

acquiring a memory space and a write temperature corresponding to to-be-rewritten data in a memory device in response to a temperature of the memory device meeting a first temperature condition, wherein the to-be-rewritten data is data has been written to the memory device while the temperature of the memory device met a second temperature condition;

performing a rewrite operation on the to-be-rewritten data according to the memory space and the write temperature corresponding to the to-be-rewritten data;

in response to the temperature of the memory device being less than a first threshold, recording the memory space and the write temperature corresponding to writing of the data to the memory device in a first list; and in response to the temperature of the memory device being greater than a second threshold, recording the memory space and the write temperature corresponding to writing of the data to the memory device in a second list.

2. The method of operating the memory controller of claim 1, wherein the first temperature condition is that a temperature difference between the temperature of the memory device and the write temperature exceeds a first temperature difference threshold.

3. The method of operating the memory controller of claim 2, wherein the first temperature condition is that the temperature difference between the temperature of the memory device and the write temperature is less than a second temperature difference threshold.

4. The method of operating the memory controller of claim 1, wherein the first temperature condition is that the temperature of the memory device is between a third threshold and a fourth threshold, wherein the fourth threshold is greater than the third threshold.

5. The method of operating the memory controller of claim 1, wherein the method further comprises:

monitoring the temperature of the memory device.

6. The method of operating the memory controller of claim 1, wherein the second temperature condition is that the temperature of the memory device is less than the first threshold or greater than the second threshold, wherein the second threshold is greater than the first threshold.

7. The method of operating the memory controller of claim 1, wherein performing the rewrite operation on the to-be-rewritten data according to the memory space and the write temperature corresponding to the to-be-rewritten data comprises:

reading the memory space and the write temperature corresponding to the to-be-rewritten data from at least one of the first list or the second list, and performing the rewrite operation on the to-be-rewritten data.

8. The method of operating the memory controller of claim 7, wherein reading the memory space and the write temperature corresponding to the to-be-rewritten data from at least one of the first list or the second list, and performing the rewrite operation on the to-be-rewritten data comprises at least one of the following:

sorting memory spaces recorded in the first list in ascending order of write temperature, sequentially reading data of the corresponding memory spaces according to a sorting result, and performing the rewrite operation; and sorting memory spaces recorded in the second list in descending order of write temperature, sequentially reading data of the corresponding memory spaces according to a sorting result, and performing the rewrite operation.

9. The method of operating the memory controller of claim 1, wherein the memory space and the write temperature corresponding to the to-be-rewritten data is recorded in units of virtual blocks in the first list and the second list.

10. The method of operating the memory controller of claim 1, further comprising:

receiving a data rewrite command, wherein the data rewrite command is used for the memory controller to perform the rewrite operation on the to-be-rewritten data when the temperature of the memory device meets the first temperature condition.

11. The method of operating the memory controller of claim 1, wherein the memory space and the write temperature corresponding to the to-be-rewritten data are stored in a host memory of a host or a controller memory of the memory controller.

12. A memory system, comprising:

a memory device; and a memory controller coupled to the memory device, wherein the memory controller is configured to:

acquire a memory space and a write temperature corresponding to to-be-rewritten data in response to a temperature of the memory device meeting a first temperature condition, wherein the to-be-rewritten data is data has been written to the memory device while the temperature of the memory device met a second temperature condition;

perform a rewrite operation on the to-be-rewritten data according to the memory space and the write temperature corresponding to the to-be-rewritten data;

in response to the temperature of the memory device being less than a first threshold, recording the memory space and the write temperature corresponding to writing of the data to the memory device in a first list; and in response to the temperature of the memory device being greater than a second threshold, recording the memory space and the write temperature corresponding to writing of the data to the memory device in a second list.

13. The memory system of claim 12, further comprising:

a temperature sensor connected with the memory controller, and configured to monitor the temperature of the memory device.

14. The memory system of claim 13, wherein the memory controller is further configured to record the memory space and the write temperature corresponding to the to-be-rewritten data in response to the temperature of the memory device meeting a second temperature condition.

15. The memory system of claim 13, wherein the memory controller comprises: a controller memory, wherein the controller memory is configured to store the memory space and the write temperature corresponding to the to-be-rewritten data that are recorded.

16. The memory system of claim 12, further comprising:

a host connected with the memory controller, and configured to send a data rewrite command to the memory controller to enable the memory controller to perform the rewrite operation on the to-be-rewritten data in the memory device when the temperature of the memory device meets the first temperature condition.

17. A memory controller, comprising:

a memory device interface configured to connect a memory device; and a controller processor connected with the memory device interface, and configured to:

acquire a memory space and a write temperature corresponding to to-be-rewritten data in the memory device in response to a temperature of the memory device meeting a first temperature condition, wherein the to-be-rewritten data is data has been written to the memory device while the temperature of the memory device met a second temperature condition;

perform a rewrite operation on the to-be-rewritten data according to the memory space and the write temperature corresponding to the to-be-rewritten data;

in response to the temperature of the memory device being less than a first threshold, recording the memory space and the write temperature corresponding to writing of the data to the memory device in a first list; and in response to the temperature of the memory device being greater than a second threshold, recording the memory space and the write temperature corresponding to writing of the data to the memory device in a second list.

18. The memory controller of claim 17, further comprising:

a controller memory connected with the controller processor, and configured to store the memory space and the write temperature corresponding to the to-be-rewritten data that are recorded.

* * * * *